(12) United States Patent
Ohara et al.

(10) Patent No.: US 7,869,077 B2
(45) Date of Patent: Jan. 11, 2011

(54) APPARATUS AND METHOD FOR DELIVERING MATERIAL USING A USER BOX AND COMPUTER PROGRAM PRODUCT

(75) Inventors: Kouji Ohara, Toyohashi (JP); Akinori Kimata, Toyohashi (JP); Ryotaro Iwase, Kawasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1154 days.

(21) Appl. No.: 10/878,571

(22) Filed: Jun. 29, 2004

(65) Prior Publication Data

US 2005/0195434 A1 Sep. 8, 2005

(30) Foreign Application Priority Data

Mar. 3, 2004 (JP) .............................. 2004-059339

(51) Int. Cl.
*G06F 3/12* (2006.01)
*G06K 15/00* (2006.01)

(52) U.S. Cl. ..................................... 358/1.16; 358/1.15
(58) Field of Classification Search ................ 358/1.16, 358/1.15
See application file for complete search history.

(56) References Cited

U.S. PATENT DOCUMENTS

| | | | | |
|---|---|---|---|---|
| 6,513,073 | B1* | 1/2003 | Kawai et al. .................... | 710/1 |
| 2002/0018241 | A1* | 2/2002 | Brewster ..................... | 358/402 |
| 2002/0035941 | A1* | 3/2002 | Nakao ........................ | 101/484 |
| 2002/0078171 | A1* | 6/2002 | Schneider .................... | 709/218 |

(Continued)

FOREIGN PATENT DOCUMENTS

JP 11242571 9/1999

(Continued)

OTHER PUBLICATIONS

Dictionary. The American Heritage® Dictionary of the English Language, Fourth Edition Copyright © 2007, 2000 by Houghton Mifflin Company. Updated in 2007. Published by Houghton Mifflin Company. Accessed from http://www.bartleby.com/61/25/M0212500.html on Dec. 10, 2008.*

(Continued)

*Primary Examiner*—Twyler L Haskins
*Assistant Examiner*—Fred Guillermety
(74) *Attorney, Agent, or Firm*—Buchanan Ingersoll & Rooney PC

(57) ABSTRACT

An apparatus and a method are provided that can easily distribute material suitable for each person or each place to which the material is distributed compared to conventional apparatuses and methods. A material delivery server is provided with a box for each user, a print data sorting portion for making the box for a user to whom material is delivered memorize print data of the material to be delivered, a print conditions memorizing portion for memorizing print conditions information for each user, a transmission data generation portion for generating print data for transmission by setting the print conditions information of a user relating to the box for the print data memorized in the box, and a print data transmission portion for transmitting the print data generated from the print data memorized in the box to a material reception terminal of the user relating to the box.

13 Claims, 24 Drawing Sheets

U.S. PATENT DOCUMENTS

| | | | |
|---|---|---|---|
| 2002/0099707 A1* | 7/2002 | Matsumoto | 707/10 |
| 2003/0081234 A1* | 5/2003 | Wiley | 358/1.13 |
| 2003/0223089 A1* | 12/2003 | Laursen et al. | 358/1.15 |
| 2004/0012812 A1* | 1/2004 | Shimizu | 358/1.15 |

FOREIGN PATENT DOCUMENTS

| | | |
|---|---|---|
| JP | 2001-043035 A | 2/2001 |
| JP | 2001125761 | 5/2001 |
| JP | 2003-084941 | 3/2003 |
| JP | 2003-094774 | 4/2003 |

OTHER PUBLICATIONS

Official Action issued by the JPO Jul. 4, 2006 in priority Application No. JP 2004-059339 and English translation thereof.

* cited by examiner

| MAJOR DIVISION | MIDDLE DIVISION | A ELEMENTARY SCHOOL | B ELEMENTARY SCHOOL | C JUNIOR HIGH SCHOOL |
|---|---|---|---|---|
| OUTPUT DEVICE | DEVICE | MULTIFUNCTION DEVICE F | MULTIFUNCTION DEVICE G | MULTIFUNCTION DEVICE H |
| PRINT CONDITIONS | FILE FORMAT | — | — | — |
| | DOUBLE-SIDED | ○ | ○ | — |
| | ENLARGE/REDUCE | 2in1 | 2in1 | 100% |
| | COLOR | ○ | — | — |
| | PAPER | recycle | recycle | recycle |
| | PUNCH | 2-HOLE | — | — |
| | STAPLE | — | — | — |
| FINISH | SORT | READ ORDER | READ ORDER | DOCUMENT ORDER |
| | PROCESSING START TIME | USER COMMAND | 17:00 EVERY DAY | 8:00 EVERY MORNING |
| | PROCESSING END TIME | — | — | — |
| | FRONT PAGE PRINTING | ○ | — | — |
| ETC. | ... | ... | ... | ... |

FIG. 8B

| MAJOR DIVISION | MIDDLE DIVISION | D JUNIOR HIGH SCHOOL | E HIGH SCHOOL | F HIGH SCHOOL |
|---|---|---|---|---|
| OUTPUT DEVICE | DEVICE | MULTIFUNCTION DEVICE H | E-MAIL | CD-RW |
| PRINT CONDITIONS | FILE FORMAT | — | pdf | tiff |
| | DOUBLE-SIDED | — | — | — |
| | ENLARGE/REDUCE | 100% | — | — |
| | COLOR | — | — | — |
| | PAPER | BACKING PAPER | — | — |
| | PUNCH | — | — | — |
| | STAPLE | — | — | — |
| FINISH | SORT | DOCUMENT ORDER | DOCUMENT ORDER | DOCUMENT ORDER |
| | PROCESSING START TIME | — | 20:00　EVERYDAY | 17:00 EVERY FRIDAY |
| | PROCESSING END TIME | 8:00 EVERY MORNING | — | — |
| ETC. | FRONT PAGE PRINTING | — | — | — |
| | ... | ... | ... | ... |

| MAJOR DIVISION | MIDDLE DIVISION | G TOWN | H TOWN | I COMPANY |
|---|---|---|---|---|
| OUTPUT DEVICE | DEVICE | MULTIFUNCTION DEVICE F | MULTIFUNCTION DEVICE G | FAX |
| PRINT CONDITIONS | FILE FORMAT | – | – | – |
| | DOUBLE-SIDED | – | – | – |
| | ENLARGE/REDUCE | 2in1 | 2in1 | – |
| | COLOR | – | – | – |
| | PAPER | recycle | recycle | – |
| | PUNCH | 2-HOLE | – | – |
| | STAPLE | – | – | – |
| FINISH | SORT | READ ORDER | READ ORDER | READ ORDER |
| | PROCESSING START TIME | USER COMMAND | 17:00 EVERYDAY | 28TH EVERY MONTH |
| ETC. | PROCESSING END TIME | – | – | – |
| | FRONT PAGE PRINTING | – | – | – |
| | ... | ... | ... | ... |

| MAJOR DIVISION | MIDDLE DIVISION | | J COMPANY | F AGENCY | ... |
|---|---|---|---|---|---|
| OUTPUT DEVICE | DEVICE | | MULTIFUNCTION DEVICE F | MULTIFUNCTION DEVICE G | ... |
| PRINT CONDITIONS | FILE FORMAT | | — | — | ... |
| | DOUBLE-SIDED | | ○ | ○ | ... |
| | ENLARGE/REDUCE | | 2in1 | 2in1 | ... |
| | COLOR | | — | — | ... |
| | PAPER | | recycle | recycle | ... |
| FINISH | PUNCH | | 3-HOLE | 2-HOLE | ... |
| | STAPLE | | ○ | ○ | ... |
| | SORT | | READ ORDER | READ ORDER | ... |
| ETC. | PROCESSING START TIME | | 17:00 EVERY DAY | 17:00 EVERY DAY | ... |
| | PROCESSING END TIME | | — | — | ... |
| | FRONT PAGE PRINTING | | — | — | ... |
| ... | ... | | ... | ... | ... |

| GROUP ID | GROUP NAME | A ELEMENTARY SCHOOL | B ELEMENTARY SCHOOL | C JUNIOR HIGH SCHOOL | D JUNIOR HIGH SCHOOL | E HIGH SCHOOL |
|---|---|---|---|---|---|---|
| 001 | SCHOOL | ○ | ○ | ○ | ○ | ○ |
| 002 | SCHOOL/NEIGHBORHOOD | ○ | ○ | ○ | ○ | ○ |
| 003 | RELATED COMPANY | — | — | — | — | — |
| 004 | MINISTRY AND AGENCY | ○ | ○ | ○ | — | ○ |
| 005 | ALL | ○ | ○ | ○ | ○ | — |
| 006 | ELEMENTARY AND JUNIOR HIGH SCHOOLS | … | … | … | … | … |
| … | | | | | | |

FIG.12B

| GROUP ID | GROUP NAME | F HIGH SCHOOL | G TOWN | H TOWN | I COMPANY |
|---|---|---|---|---|---|
| 001 | SCHOOL | ○ | – | – | – |
| 002 | SCHOOL/NEIGHBORHOOD | ○ | ○ | ○ | – |
| 003 | RELATED COMPANY | – | – | – | ○ |
| 004 | MINISTRY AND AGENCY | ○ | ○ | ○ | ○ |
| 005 | ALL | – | – | – | – |
| 006 | ELEMENTARY AND JUNIOR HIGH SCHOOLS | ... | ... | ... | ... |
| ... | ... | | | | |

| GROUP ID | GROUP NAME | J COMPANY | F AGENCY | ... |
|---|---|---|---|---|
| 001 | SCHOOL | — | — | ... |
| 002 | SCHOOL/NEIGHBORHOOD | ○ | — | ... |
| 003 | RELATED COMPANY | ○ | — | ... |
| 004 | MINISTRY AND AGENCY | — | ○ | ... |
| 005 | ALL | ○ | ○ | ... |
| 006 | ELEMENTARY AND JUNIOR HIGH SCHOOLS | — | — | ... |
| ... | ... | ... | ... | ... |

B01 A ELEMENTARY SCHOOL PROCESSING CONTENTS SELECTION
<■SELECT □NONSELECT>
■MFP
OUTPUT DESTINATION <■CF2001(WEST) □CF2001(EAST) □DI850(COPY CENTER) □DI350(EAST)>
PRINT CONDITIONS <■DISPLAY □SINGLE-SIDED><■100% □2in1><■COLOR □MONOCHROME>
<■CHARACTER/PHOTO □CHARACTER □PHOTO><■GRADATION PRIORITY□RESOLUTION PRIORITY>
<■PUNCH: ■2-HOLE□3-HOLE><■STAPLE: □CORNER□BACK □FRONT □2 POINTS>
<□SORT:□READ ORDER □NAME ORDER><□BINDING:□MAGAZINE BINDING □MIDDLE BINDING □MIDDLE FOLDING>
<■FOLDING : □HALF FOLDING □MIDDLE FOLDING>
□E-MAIL        MORE IN DETAIL
□MEDIUM    MORE IN DETAIL
□FAX            MORE IN DETAIL
■ETC <□SPECIFY PROCESSING TIME  START AT 8:00 EVERYDAY > < ■ PRINT FRONT PAGE>

INDEPENDENT PROCESSING CONDITIONS ARE SET FOR THE FOLLOWING DISTRIBUTION MATERIAL.
1.SARS INFORMATION                                       MORE IN DETAIL  □APPLY DOCUMENT PROCESSING CONDITIONS
2.NOTICE OF EDUCATOR TRAINING  MORE IN DETAIL  □APPLY DOCUMENT PROCESSING CONDITIONS

APPARATUS AND METHOD FOR DELIVERING MATERIAL USING A USER BOX AND COMPUTER PROGRAM PRODUCT

This application is based on Japanese Patent Application No. 2004-059339 filed on Mar. 3, 2004, the contents of which are hereby incorporated by reference.

BACKGROUND OF THE INVENTION

1. Field of the Invention

The present invention relates to a multifunction peripheral (MFP) having a function of saving document data such as image data and others.

2. Description of the Related Art

Conventionally, when distributing material to plural places or people, in many cases, a distributor prints sufficient material for people to whom the material is distributed and sends the printed material to each place or person by post. In the case of distributing material from a government office to each local authority or to each school, for example, the required number of material is prepared by copying or other ways to be sent to each destination by post. On this occasion, the whole material prepared for a predetermined period of time (for one or several days, for example) is often mailed at the same time in order to save expenditure on mailing.

However, people or places to which material is distributed are not always the same and are different depending on contents or purpose of material. Accordingly, a work is required of printing material and sorting the printed material according to each person or place to which the material is distributed, which is a substantial burden for a worker. Additionally, it is also required to ensure a space used only for keeping the printed material thus sorted, such as a document box.

Requests concerning print conditions of printed material differ for each person or place to which material is distributed. In recent years, especially, since a printing device has plural functions of, for example, color printing, change in resolution, 2-in-1 printing, double-sided printing, a staple process, a punch process and others, various requests are made depending on the number of combinations of the functions.

There are proposed methods described in Japanese unexamined patent publication Nos. 2003-84941, 11-242571, 2003-94774 and 2001-125761. According to the method described in Japanese unexamined patent publication No. 2003-84941, since plural jobs in a box can be coupled together, a burden of sorting imposed on a worker can be reduced.

According to the method described in Japanese unexamined patent publication No. 11-242571, a resetting of print mode is performed and printing can be carried out using the style of the reset print mode. The method described in Japanese unexamined patent publication No. 2003-94774 enables printing in various types of print modes. According to the method described in Japanese unexamined patent publication No. 2001-125761, a printer suitable for a print attribute of print data can be selected from plural printers for printing. Accordingly, it is possible to print material satisfying each request of people or places to which the material is distributed.

In the method described in Japanese unexamined patent publication No. 1003-84941, however, it is impossible to comply with requests regarding print conditions, the requests being made by people to whom material is distributed. In the methods described in Japanese unexamined patent publication Nos. 11-242571, 2003-94774 and 2001-125761, various types of printed material are provided for the same one piece of material, which increases a burden imposed on a worker who sorts the printed material compared to conventional methods.

SUMMARY OF THE INVENTION

The present invention is directed to solve the problems pointed out above, and therefore, an object of the present invention is to easily distribute material suitable for each person or each place to which the material is distributed compared to conventional methods.

According to one aspect of the present invention, a material delivery apparatus includes a user memory area prepared for each user, a data memory control portion for making the user memory area for a user to whom material is delivered memorize material data of the material to be delivered, a print conditions memorizing portion for memorizing print conditions for each user, a print data generation portion for generating print data by setting the print conditions of a user relating to the user memory area for the material data memorized in the user memory area, and a transmission portion for transmitting the print data that are generated based on the material data memorized in the user memory area to a terminal of the user relating to the user memory area.

Preferably, the print data generation portion generates print data of all untransmitted material data as batch processing, the all untransmitted material data being memorized in the user memory area for one user, and the transmission portion transmits the print data as batch processing.

Further, the material data are associated with delivery source print conditions that are print conditions set by a delivery source of the material, and when any of material memorized in the user memory area is specified, the print data generation portion generates print data by setting the delivery source print conditions corresponding to the material data of the material for the material data instead of setting the print conditions for the material data.

Moreover, concerning the whole or a part of the user memory area, link information indicating a memory location of the material data and a data name thereof may be stored instead of the material data. For example, when plural users are specified as delivery destinations of the material, the data memory control portion makes any one of the user memory areas for the users memorize the material data of the material and makes the other user memory areas memorize the link information of the material data instead of the material data. Furthermore, a second memory area that is a memory area different from the user memory area is prepared and, the second memory area is made to memorize the material data and the user memory area is made to memorize the link information of the material data instead of the material data. Then, the print data generation portion generates print data using the material data indicated in the link information when the link information is memorized in the user memory area.

As discussed above, the present invention enables distribution of material suitable for each person or each place to which the material is distributed in an easier way than conventional ways. The present invention further enables printing at a time when a terminal of a user is idle, for example, during nighttime.

Moreover, according to the present invention, a user to whom material is distributed can obtain material having print conditions designated by a person who distributes the material. The present invention allows for space-saving of a memory area for accumulating material data.

These and other characteristics and objects of the present invention will become more apparent by the following descriptions of preferred embodiments with reference to drawings.

BRIEF DESCRIPTION OF THE DRAWINGS

FIGS. 8A-8D are tables showing an example of print conditions information.

FIGS. 12A-12C are tables showing an example of distribution group information.

FIG. 21 shows an example of a distribution material selection window.

DESCRIPTION OF THE PREFERRED EMBODIMENTS

Figure 1:
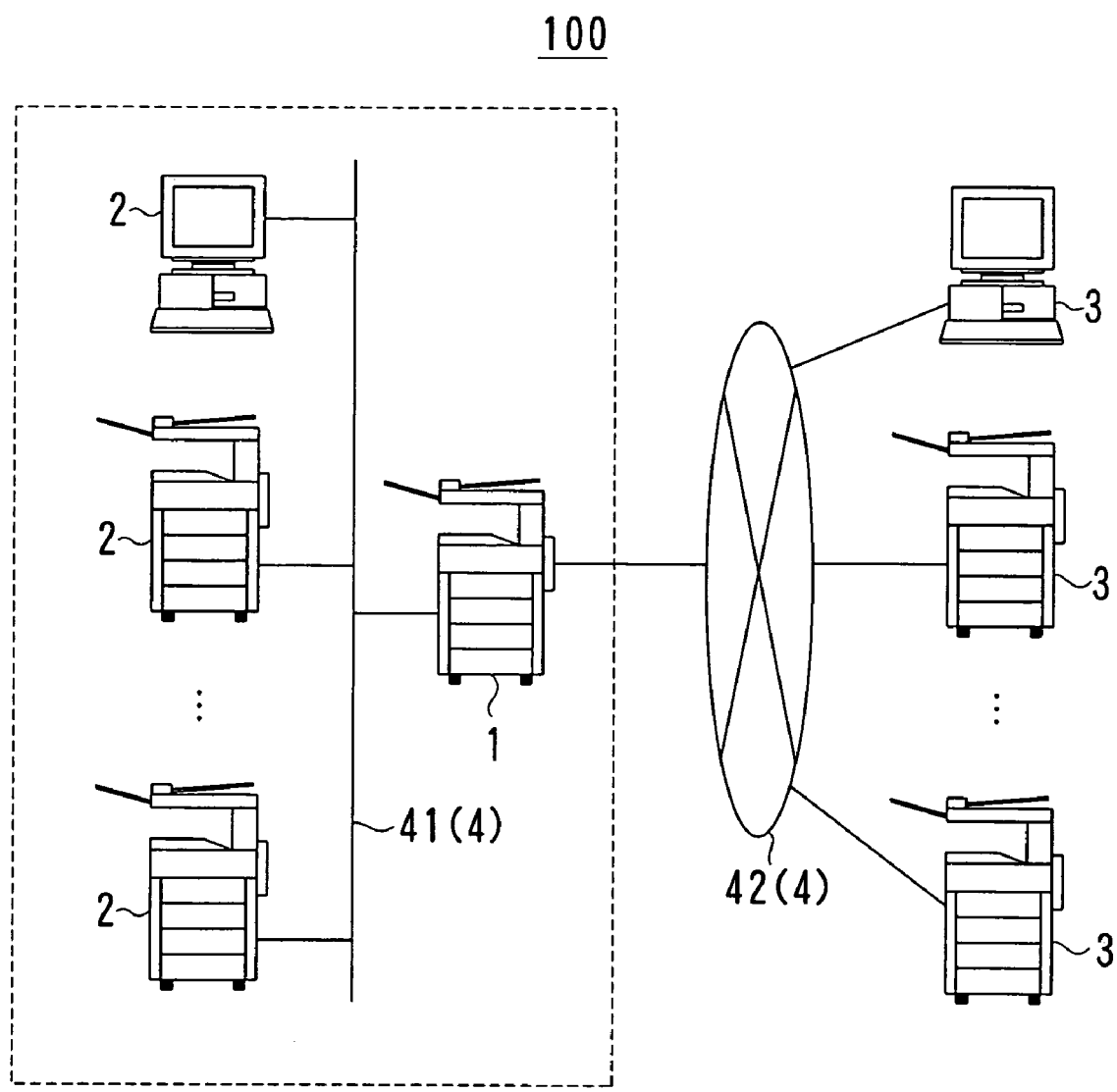
FIG. 1 is a diagram showing an example of the entire structure of a material delivery system.
Figure 2:
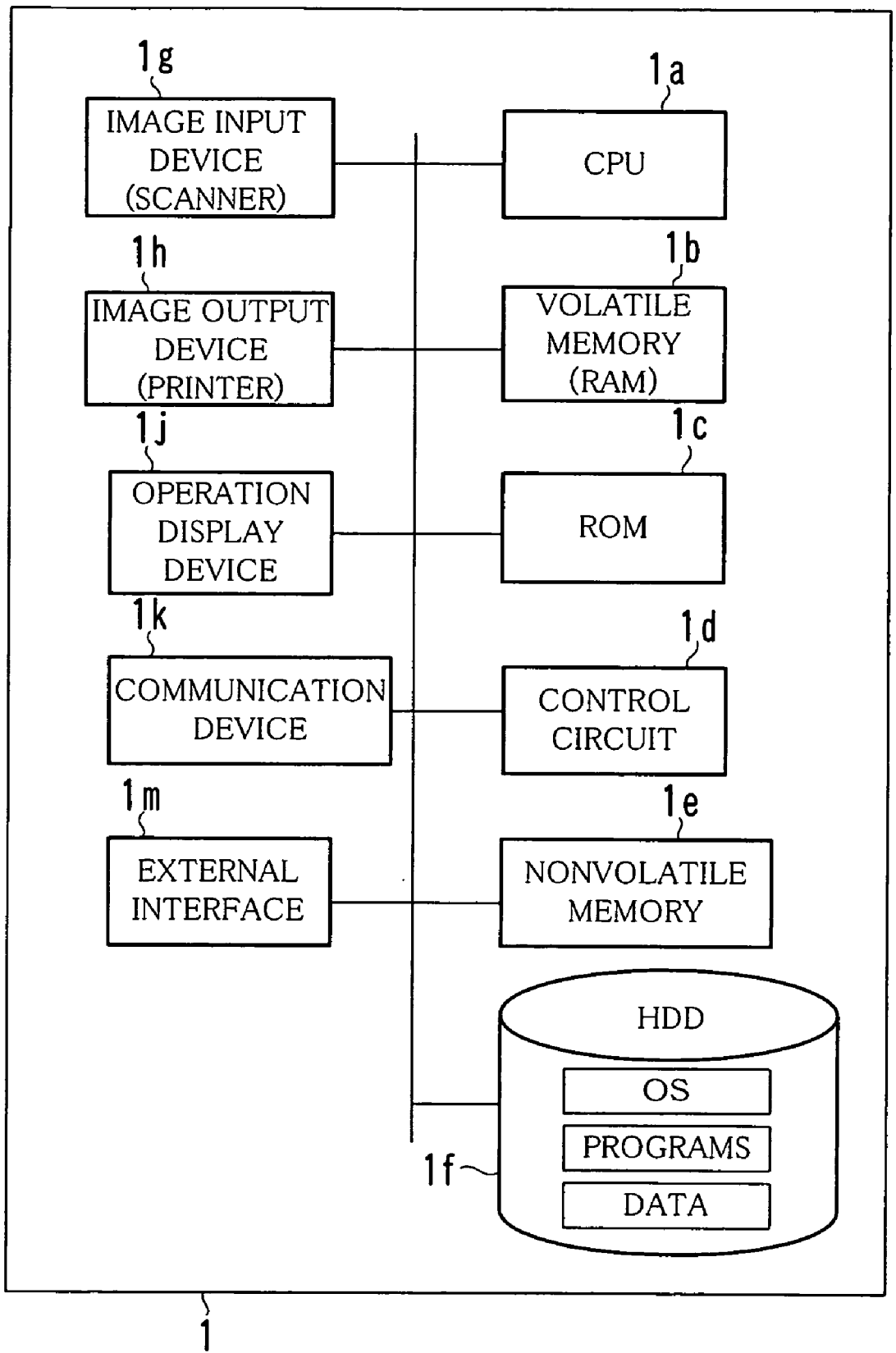
FIG. 2 is a diagram showing an example of a hardware structure of a material delivery server.
Figure 3:
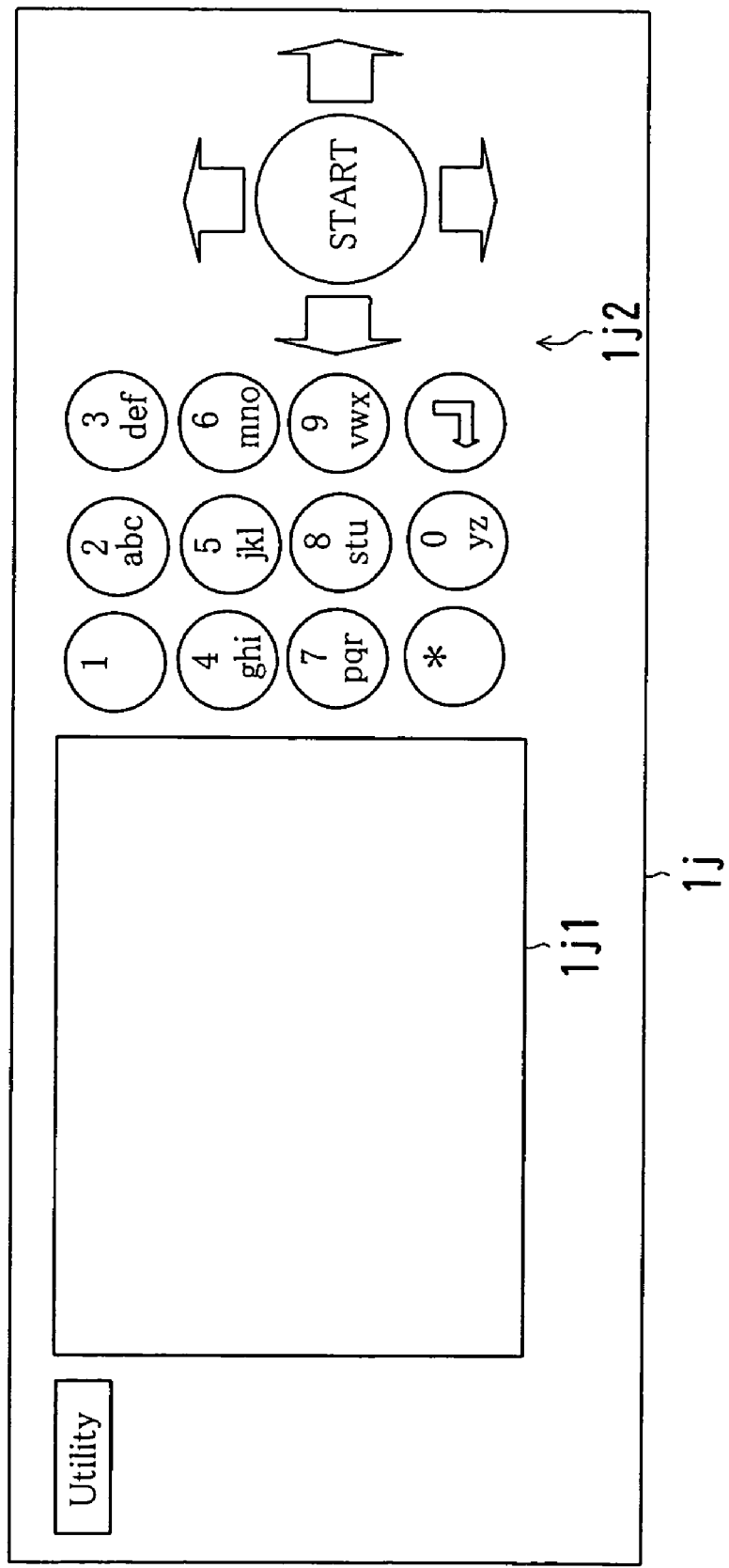
FIG. 3 shows an example of an appearance of an operation display device.
Figure 4:
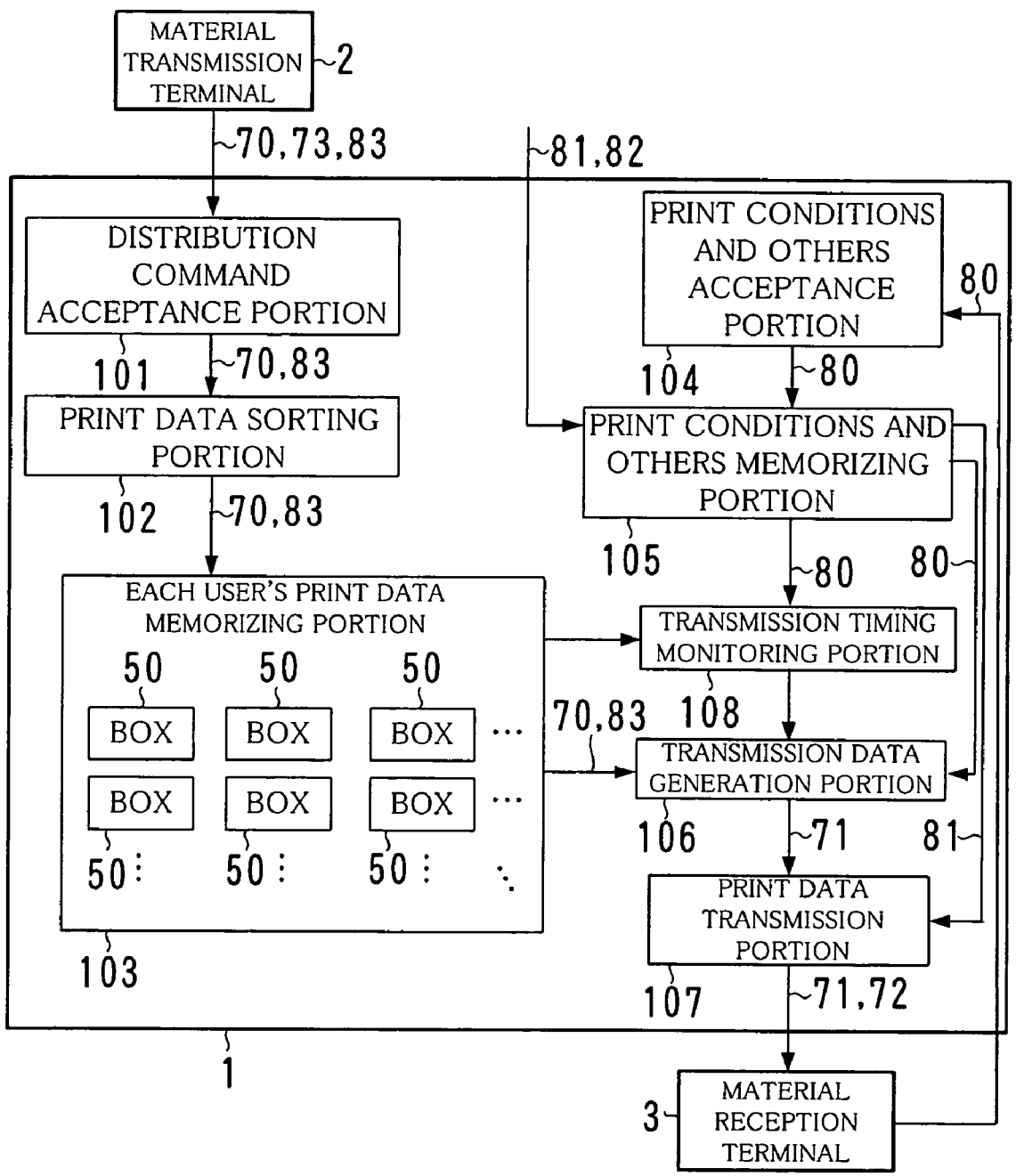
FIG. 4 is a block diagram illustrating an example of a functional structure of the material delivery server.

FIG. 1 is a diagram showing an example of the entire structure of a material delivery system 100, FIG. 2 is a diagram showing an example of a hardware structure of a material delivery server 1, FIG. 3 shows an example of an appearance of an operation display device 1j and FIG. 4 is a block diagram illustrating an example of a functional structure of the material delivery server 1.

As shown in FIG. 1, the material delivery system 100 includes the material delivery server 1 according to the present invention, a material transmission terminal 2, a material reception terminal 3 and a communication line 4. The material delivery server 1 is connected to each of the material transmission terminal 2 and the material reception terminal 3 via the communication line 4.

As the material delivery server 1, for example, a multifunction device in which functions of a copier, a printer, a scanner, a fax machine, a document server or others are consolidated can be used. Such a multifunction device is sometimes called a multifunction peripheral (MFP). Alternatively, a server machine such as a UNIX (registered trademark) server or what is commonly called a PC server can be used as the material delivery server 1. Hereinafter, an explanation is given to a case where a multifunction peripheral (MFP) is used as the material delivery server 1.

Referring to FIG. 2, the material delivery server 1 includes a CPU 1a, a RAM 1b, a ROM 1c, a control circuit 1d, a nonvolatile memory 1e, a magnetic storage device (a hard disk drive) 1f, an image input device 1g, an image output device 1h, an operation display device 1j, a communication device 1k and an external interface 1m.

The image input device 1g includes a document set glass, an image sensor such as a CCD and an automatic document feeder. The image input device 1g reads an image on a document surface of a document paper optically to convert the image thus read into electronic data, so that image data are generated. In short, the image input device 1g is a scanner. The image output device 1h is a printing device (a printer) that performs printing of an image on a predetermined sheet of paper based on print data.

The operation display device 1j is a user interface for a user of the material delivery server 1 and includes a liquid crystal display 1j1 and a control panel 1j2 as shown in FIG. 3. The liquid crystal display 1j1 serves to display an operation window, a setting window or others. The control panel 1j2 has buttons or keys such as a numeric keypad, a start button, a cursor key and a utility button. The operation display device 1j may be a touchscreen.

The communication device 1k serves to exchange data with the material transmission terminal 2 and the material reception terminal 3 via the communication line 4. As the communication device 1k, a Network Interface Card (NIC), a modem or others is used. The external interface 1m is an interface such as a Universal Serial Bus (USB), RS-232C or others, and is used for connection to peripheral equipment such as a digital camera. The use of the external interface 1m enables connection to the material transmission terminal 2 or the material reception terminal 3.

The nonvolatile memory 1e is a rewritable and nonvolatile memory such as an EEPROM or a flash memory. The ROM 1c is a read-only memory. Although a ROM is generally included in a nonvolatile memory, in the present embodiment, the ROM is distinguished from the EEPROM or the flash memory. Accordingly, the former is referred to as the "ROM 1c", while the latter is referred to as the "nonvolatile memory 1e".

The CPU 1a and the control circuit 1d serve to control each portion constituting the material delivery server 1. Stated differently, the CPU 1a and the control circuit 1d are control portions for controlling the whole of the material delivery server 1.

The RAM 1b is used as an image memory for temporarily memorizing image data that are received from external devices or image data that are obtained by the image input device 1g and used as a working memory for executing programs.

On the magnetic storage device 1f are memorized programs such as, for example, an operating system (OS), firmware and server software, data and others.

The firmware includes programs for performing processing relating to functions of a copier, a printer, a scanner, a fax machine, a document server or others, i.e., processing relating to a basic function of the material delivery server 1. The firmware includes, for example, a program for basic control of each hardware constituting the material delivery server 1 and a program for compression and decoding of image data.

The server software includes a Web server program for delivering Web (WWW) pages, a Common Gateway Interface (CGI) program for transmitting and receiving information to and from a Web browser of a client machine, a program for sending e-mail messages, a program for converting file formats. The server software also includes programs for realizing functions of various portions including a distribution command acceptance portion 101, a print data sorting portion 102, an each user's print data memorizing portion 103, a print conditions and others acceptance portion 104, a print conditions and others memorizing portion 105, a transmission data generation portion 106, a print data transmission portion 107 and a transmission timing monitoring portion 108, all of which are shown in FIG. 4.

These programs and data are loaded on the RAM 1*b* as required and the programs are executed by the CPU 1*a*. The whole or a part of programs memorized in the magnetic storage device 1*f* may be memorized in the ROM 1*c* or the nonvolatile memory 1*e*. Further, it is possible that a processor (the control circuit 1*d*) realizes the whole or a part of functions shown in FIG. 4.

Referring to FIG. 1 again, an MFP, a personal computer, a workstation, a facsimile terminal or the like is used as each of the material transmission terminal 2 and the material reception terminal 3. A printing device (a printer), a CD-RW drive or the like is connected to the material reception terminal 3. Hereinafter, a personal computer or a workstation is sometimes referred to as a "PC".

The material delivery system 100 is used for distributing material to plural users at a time. A distributor of material specifies users to whom the material is distributed to transmit material data of the material from a material transmission terminal 2 of the distributor to the material delivery server 1. Then, the material data are processed according to need and are delivered to material reception terminals 3 of the specified users through the material delivery server 1.

Hereinafter, in order to explain the processing contents, a material delivery system 100 is taken as an example that is used for distributing an image of material composed of a text, a picture, an illustration, a chart or others from a government office to associations as users, for example, schools, local authorities or companies. In such a case, a material delivery server 1 is installed at information systems division in the government office or others, a material transmission terminal 2 is installed at each division from which material (an image) is delivered (distributed) and a material reception terminal 3 is installed at each association where the material (the image) is received. Material to be distributed (delivered) from the government office to the associations is sometimes refereed to as "distribution material" below. Additionally, a user distributing (delivering) distribution material is sometimes refereed to as a "source user", while associations receiving the distribution material are sometimes referred to as "endpoint users".

[Setting Relating to Endpoint Users]

Figure 5:
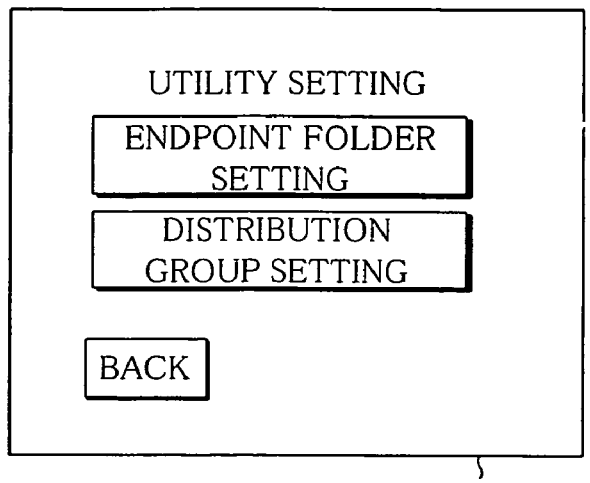
FIG. 5 shows an example of a utility setting window.
Figure 6:
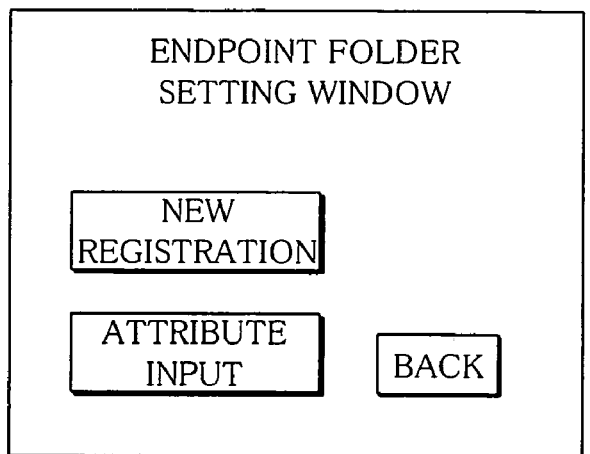
FIG. 6 shows an example of an endpoint folder setting window.
Figure 7:
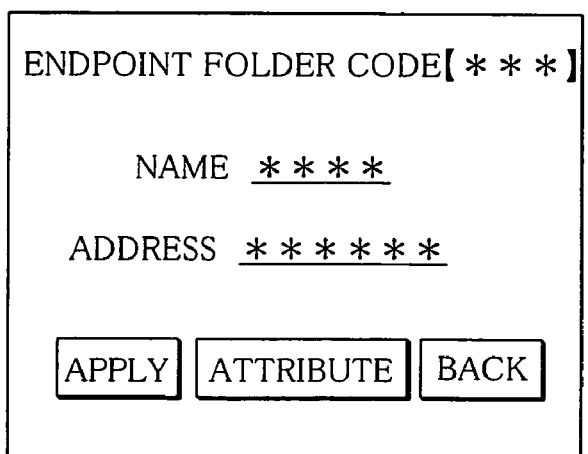
FIG. 7 shows an example of a new document window.
Figure 9:
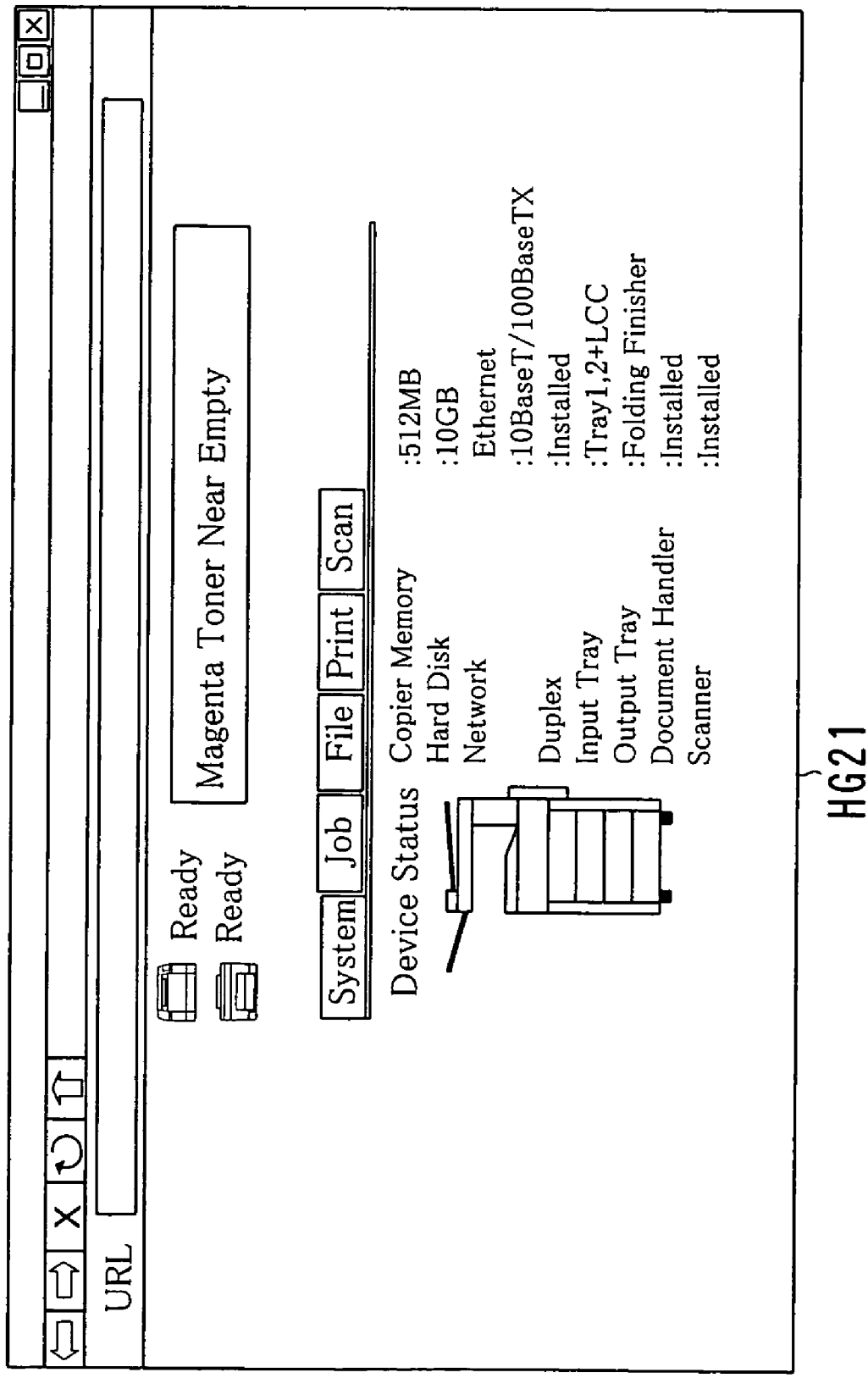
FIG. 9 shows an example of a status window.
Figure 10:
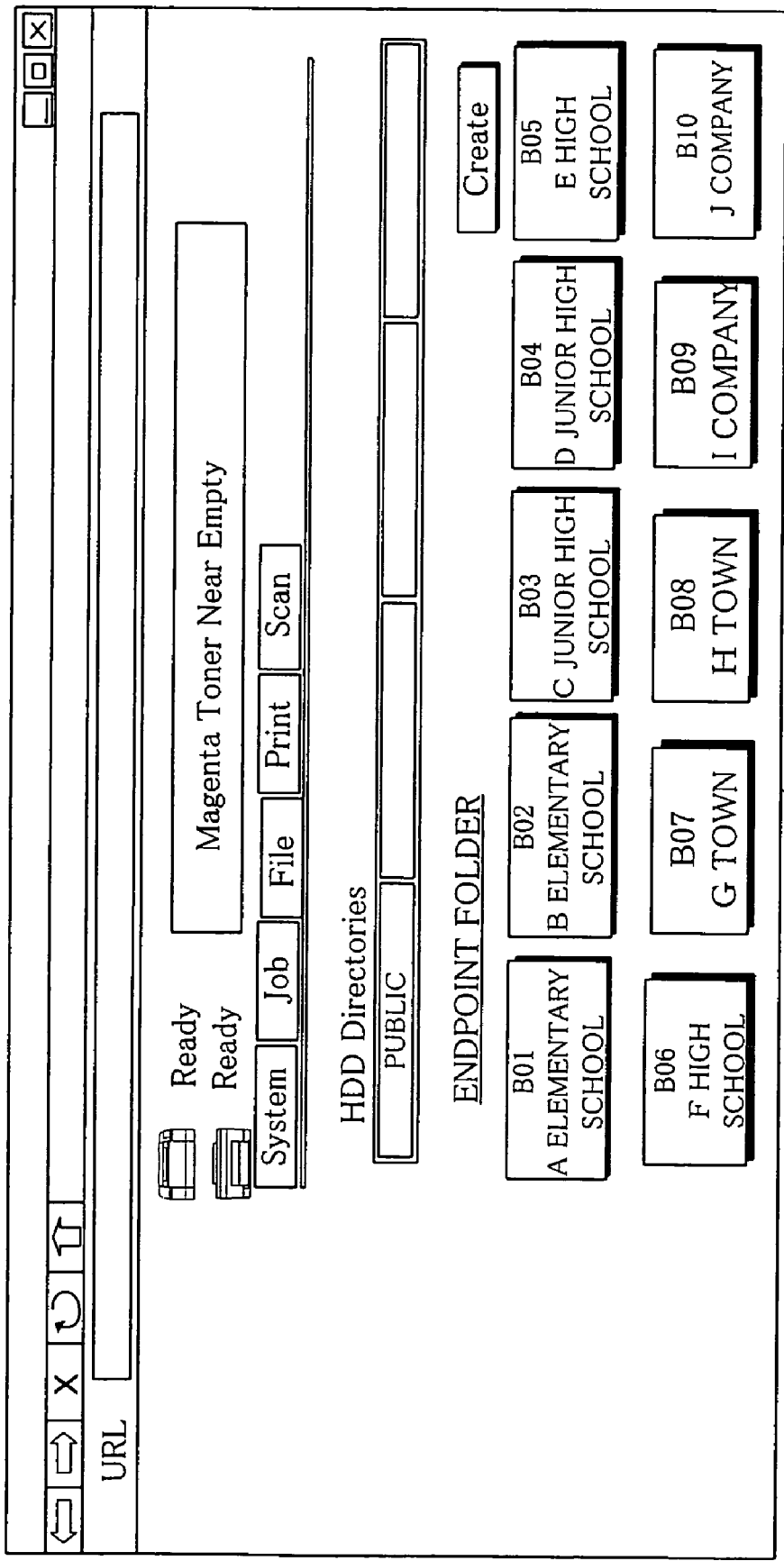
FIG. 10 shows an example of a folder selection window.
Figure 11:
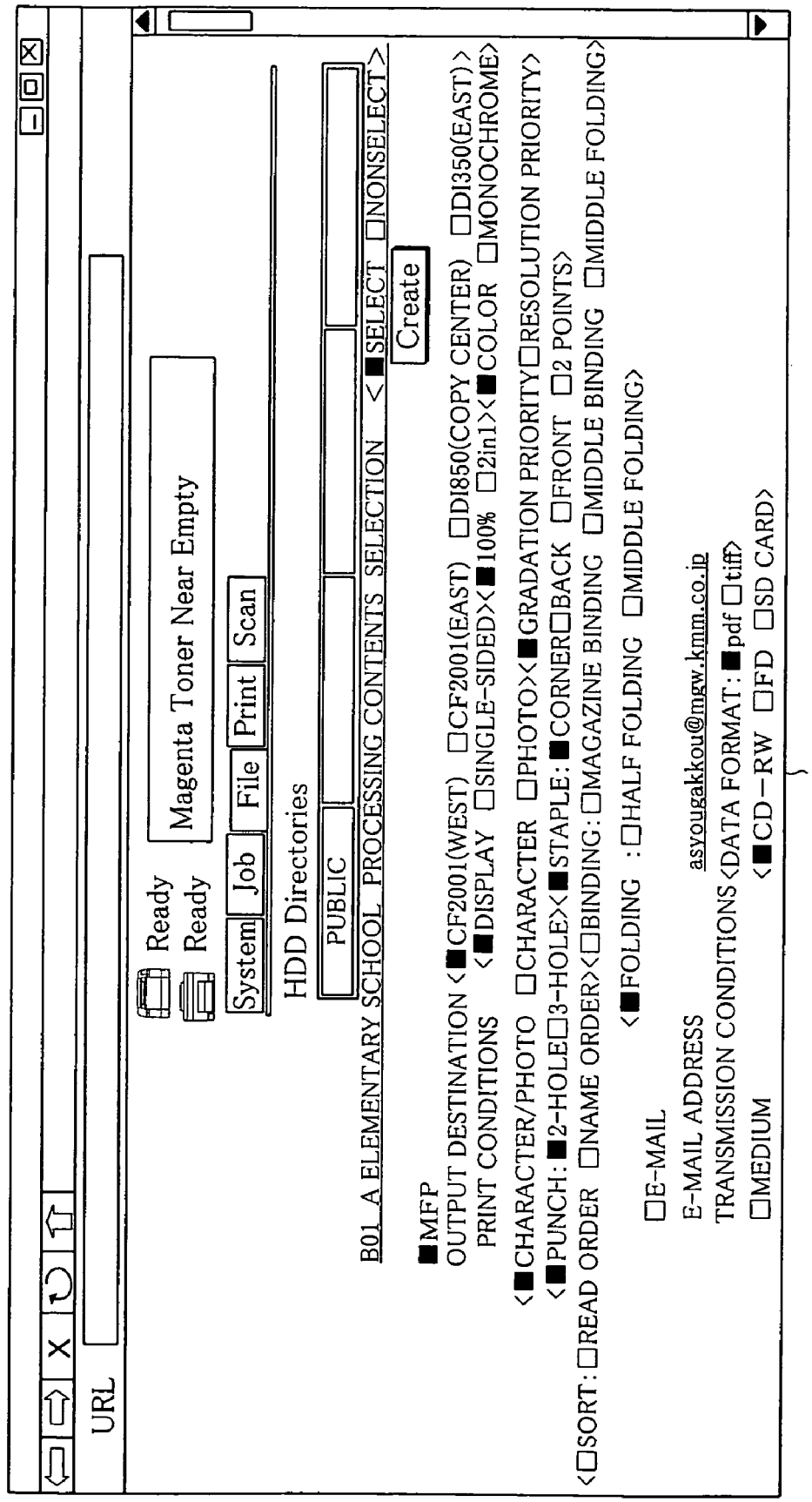
FIG. 11 shows an example of an attribute selection window.
Figure 13:
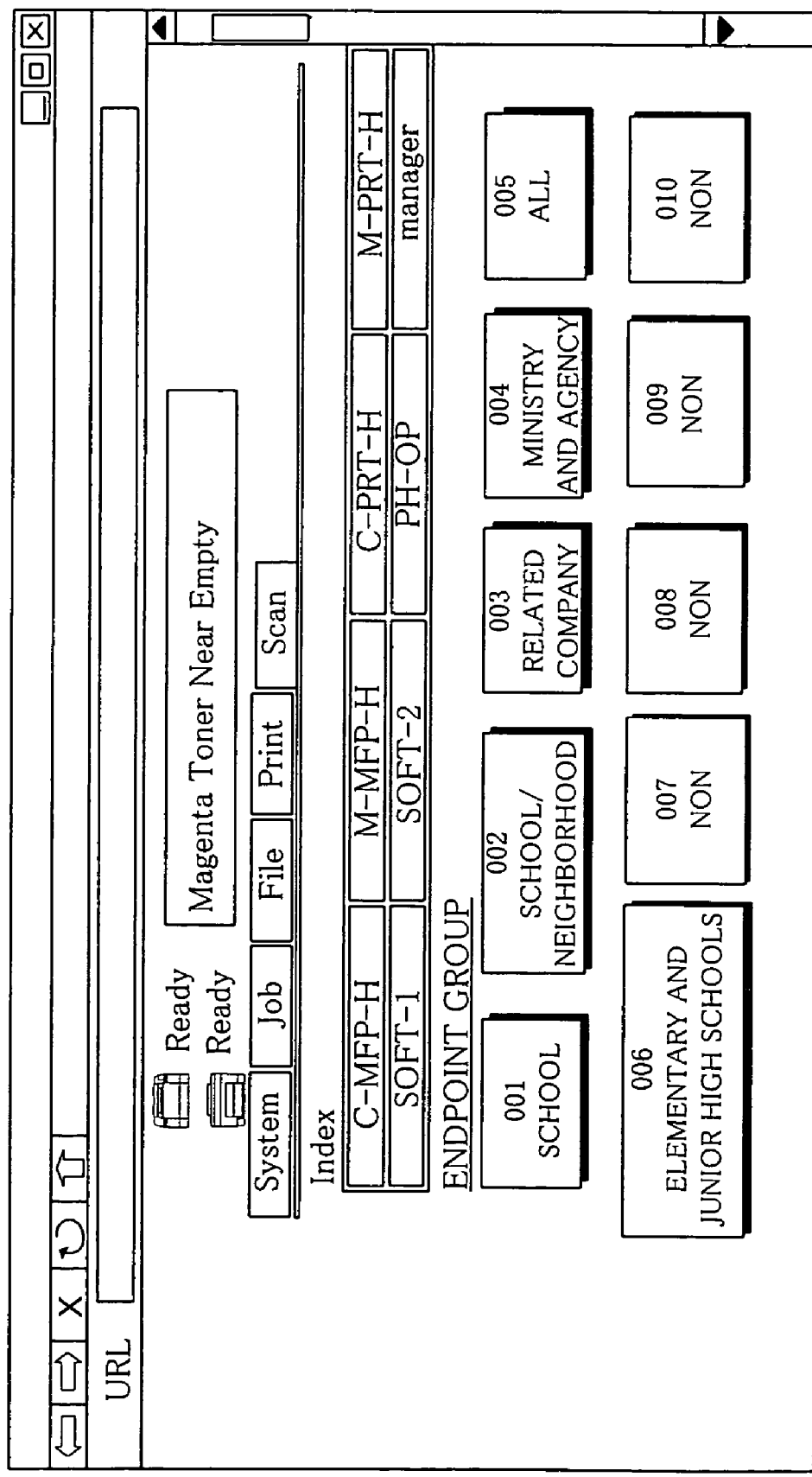
FIG. 13 shows an example of a distribution group selection window.
Figure 14:
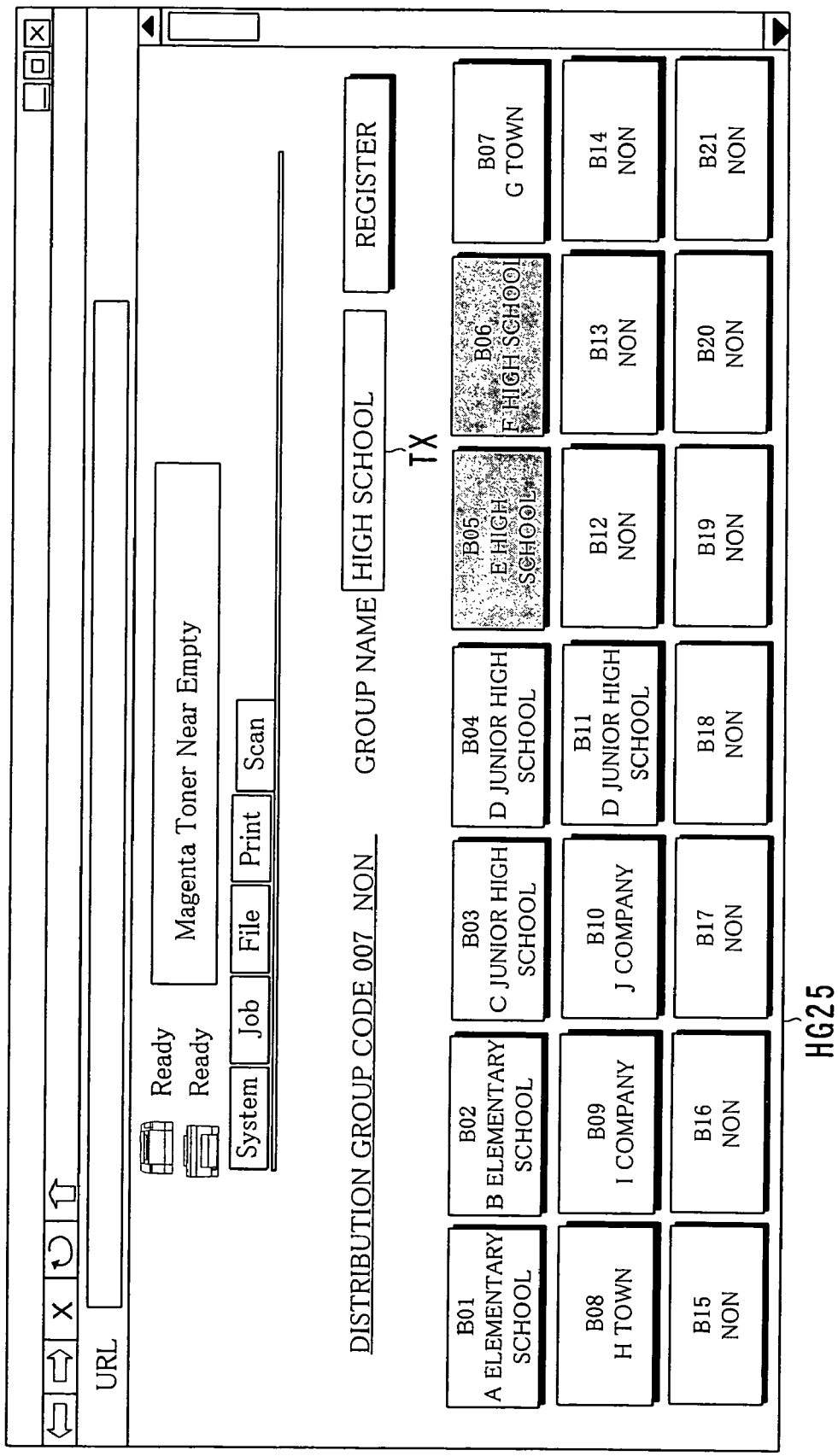
FIG. 14 shows an example of a distribution group attribute window.
Figure 15:
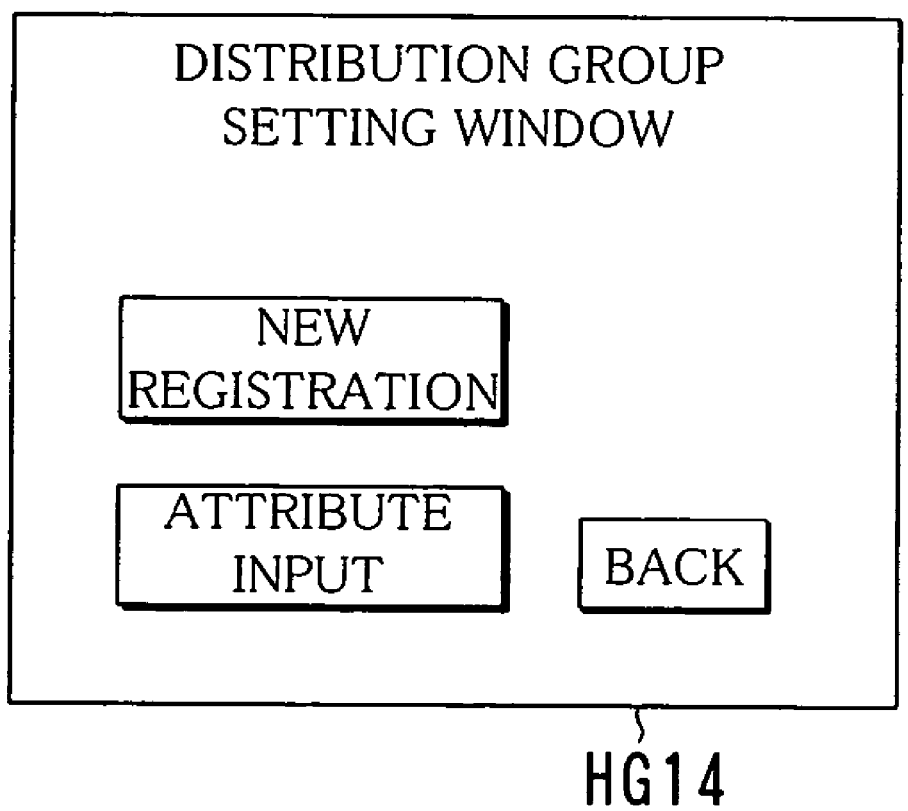
FIG. 15 shows an example of a distribution group setting window.

FIG. 5 shows an example of a utility setting window HG11, FIG. 6 shows an example of an endpoint folder setting window HG12, FIG. 7 shows an example of a new document window HG13, FIGS. 8A-8D are tables showing an example of print conditions information 80, FIG. 9 shows an example of a status window HG21, FIG. 10 shows an example of a folder selection window HG22, FIG. 11 shows an example of an attribute selection window HG23, FIGS. 12A-12C are tables showing an example of distribution group information 82, FIG. 13 shows an example of a distribution group selection window HG24, FIG. 14 shows an example of a distribution group attribute window HG25 and FIG. 15 shows an example of a distribution group setting window HG14.

As shown in FIG. 1, the communication line 4 includes an internal line 41 and an external line 42. The internal line 41 and the external line 42 are connected to each other via a router, a firewall or the like. The internal line 41 is a LAN and serves to make a connection between the material delivery server 1 and each of the material transmission terminals 2. The external line 42 is the Internet, a public line or a private line and serves to make a connection between the material delivery server 1 and each of the material reception terminals 3. Communication protocol can be TCP/IP, FTP, HTTP, SMTP, POP3 or the like.

The each user's print data memorizing portion 103 shown in FIG. 4 manages a box 50 prepared for each endpoint user (association). A "box" is a memory area for accumulating (saving) document files such as distribution material and, is sometimes called a "personal box". A "box" is equivalent to a "folder" or a "directory" in a PC. A box is sometimes referred to as a "folder" below.

Each of the boxes 50 is provided in the each user's print data memorizing portion 103 by the following steps. When accepting a request to prepare a box 50 from an endpoint user, a person in charge in a government office presses a utility button labeled "Utility" in the operation display device 1*j* (see FIG. 3) of the material delivery server 1. Then, the liquid crystal display 1*j*1 displays the utility setting window HG11 as shown in FIG. 5.

Subsequently, the person in charge selects an "endpoint folder set" button to display the endpoint folder setting window HG12 as illustrated in FIG. 6. Then, the person selects a "new registration" button to display the new document window HG13 shown in FIG. 7. Here, the person enters an ID (a code) for identifying a box (a folder), a name of an endpoint user (a name of an association) that made the request to prepare a box and an address of a material reception terminal 3 of the endpoint user, then to select an "apply" button. As the address of the material reception terminal 3, an IP address, an e-mail address, a facsimile number or the like is specified. In addition, the address can be respecified using the attribute selection window HG23 (see FIG. 11), which is explained later.

The each user's print data memorizing portion 103 generates another box 50 for the endpoint user and associates the items entered on the new document window HG13 with the newly generated box 50 as user information 81. In this way, boxes 50 are provided for the respective endpoint users.

The print conditions and others memorizing portion 105 memorizes, as shown in FIGS. 8A-8D, the print conditions information 80 indicative of print conditions of each endpoint user. The print conditions information 80 is set depending on a preference of each endpoint user, specification of each material reception terminal 3 and others.

An item of "device" included in the print conditions information 80 shows a type of a material reception terminal 3 used for outputting distribution material that an endpoint user obtains from a government office and others. When an endpoint user obtains distribution material from a government office via e-mail, a set value of "e-mail" is stored irrespective of a type of a material reception terminal 3. When distribution material is outputted to a recording medium such as a CD-RW, a set value of "CD-RW" or the like is stored irrespective of a type of a material reception terminal 3.

An item of "file format" indicates a file format (type) used for transmitting data of distribution material to a material reception terminal 3 when "e-mail" or "CD-RW" is specified as the item of "device".

An item of "double-sided" shows whether or not printing is performed on both sides of a sheet of paper. An item of "enlarge/reduce" indicates a setting relating to enlarged printing or reduced printing such as 2-in-1 printing. An item of "color" shows whether or not color printing is performed. An item of "paper" indicates a type of paper used for printing. Note that, in FIGS. 8A-8D, a circle means that corresponding processing is performed, while a hyphen means that corresponding processing is not performed.

Items of "punch", "staple" and "sort" indicate a setting relating to finish (finishing). The item of "punch" shows whether or not printed material of distribution material is punched a hole and shows the number of punched holes. The item of "staple" shows whether or not printed material of distribution material is stapled. The item of "sort" shows a method for arraying printed material of distribution material. When printed material is outputted in the order of accumulation on a box 50, a set value of "read order" is stored. When printed material is outputted in accordance with numerical order or others of distribution material, a set value of "document order" is stored.

An item of "processing start time" shows date and time when processing is started for transmitting distribution material accumulated in a box 50 to a material reception terminal 3 of an endpoint user who is an owner of the box 50. When processing start is intended after instructions of an endpoint user, a set value of "user command" is stored. An item of "processing end time" shows desired date and time when processing is completed for transmitting distribution material accumulated in a box 50 to a material reception terminal 3 to print the same. An item of "front page printing" shows whether or not printed material of distribution material accumulated in a box 50 includes a front page (a list).

Except for the items shown in FIGS. 8A-8D, the print conditions information 80 has items including "binding" for setting magazine binding, middle binding, middle folding or others, "document type" for setting a character print mode, a photo print mode, a character/photo print mode or others and "priority" for setting whether priority is given to gradation, resolution or others.

As a method for registering this print conditions information 80 on the print conditions and others memorizing portion 105, there are a registration method using a PC and a registration method using an MFP. The registration method using a PC is performed through the following procedure. First, a staff of an endpoint user (an association) enters a predetermined Uniform Resource Locator (URL) in a Web browser of a PC to access to a Web site used for managing the material delivery server 1. In response to this, the status window HG21 as shown in FIG. 9 is displayed on a display of the PC. Note that although the status window HG21 is a top page of the Web site, the status window HG21 is also used for showing a status of the material delivery server 1.

Subsequently, the staff clicks a "File" menu to display the folder selection window HG22 shown in FIG. 10. Then, the staff clicks a button where the name of the endpoint user is indicated (e.g., "B01 A elementary school") to display the attribute selection window HG23 shown in FIG. 11. Here, the staff checks checkboxes or others so that all items of print conditions are specified in accordance with a preference of the endpoint user, specification of a material reception terminal 3 or others. After that, the staff clicks a "Create" button.

In response to that, contents specified on the attribute selection window HG23 are transmitted from the PC to the material delivery server 1. The print conditions and others acceptance portion 104 shown in FIG. 4 receives the contents to make the print conditions and others memorizing portion 105 register the contents as print conditions information 80 for the endpoint user.

The registration method using an MFP (the material delivery server 1, for example) is performed through the following procedure. First, a staff of an endpoint user operates the operation display device 1j (see FIG.3) to display the endpoint folder setting window HG12 (see FIG. 6).

Subsequently, the staff selects an "attribute input" button to display a folder selection window. This folder selection window is used for selecting a folder (a box) of the endpoint user and is similar to the folder selection window HG22 (see FIG. 10) mentioned above. The staff clicks a button where the name of the endpoint user is indicated to display an attribute selection window. This attribute selection window is also similar to the attribute selection window HG23 (see FIG. 11) discussed above. Here, all items of print conditions are specified in accordance with a preference of the endpoint user, specification of a material reception terminal 3 or others. The print conditions and others acceptance portion 104 shown in FIG. 4 makes the print conditions and others memorizing portion 105 register the specified contents as print conditions information 80.

In these ways, the print conditions information 80 are registered in the print conditions and others memorizing portion 105. In addition to the print conditions information 80, the print conditions and others memorizing portion 105 also memorizes the distribution group information 82 as shown in FIGS. 12A-12C. Here, "distribution group" means a set of endpoint users that have common features. The distribution group information 82 indicates endpoint users belonging to each distribution group. A provider of distribution material (a source user) can designate a distribution group to specify plural endpoints at a time.

When a user operates a PC to register the distribution group information 82, the user clicks a "Scan" menu on the status window HG21 (see FIG. 9) to display the distribution group selection window HG24 shown in FIG. 13. Then, the user clicks an unused distribution group button (a "007 Non" button, for example) to display the distribution group attribute window HG25 shown in FIG. 14. On the distribution group attribute window HG25 is indicated a list of endpoint users registered in the material delivery server 1 in the form of buttons. On the distribution group attribute window HG25, endpoint users to be affiliated with a distribution group are selected by clicking buttons where names of the endpoint users are indicated. When a group is required to be given a name, a group name is typed in a text box TX. After that, a "register" button is clicked.

In response to this, information indicative of the selected endpoint users and the typed group name is sent to the material delivery server 1. The print conditions and others acceptance portion 104 accepts the information to update the distribution group information 82 in accordance with the contents of the information. Thus, the updated distribution group information 82 is registered in the print conditions and others memorizing portion 105.

When it is intended to change members (endpoint users) of the currently used distribution group, a button of the corresponding distribution group may be selected on the distribution group selection window HG24 to add or delete members on the distribution group attribute window HG25.

When a user operates an MFP such as the material delivery server 1 to register the distribution group information 82, a procedure similar to the case where a PC is operated for registration is performed. More specifically, the user operates the operation display device 1j to select a "distribution group setting" button on the utility setting window HG11 shown in FIG. 5 and then, selects the "attribute input" button on the distribution group setting window HG14 shown in FIG. 15.

Then, a window similar to the distribution group selection window HG24 is displayed. After that, an operation similar to the case where a PC is used is carried out to select a distribution group. Further, a window similar to the distribution group attribute window HG25 is used to select members (endpoint users) to be put in the distribution group.

[Sorting of Distribution Material]

Figure 16A:
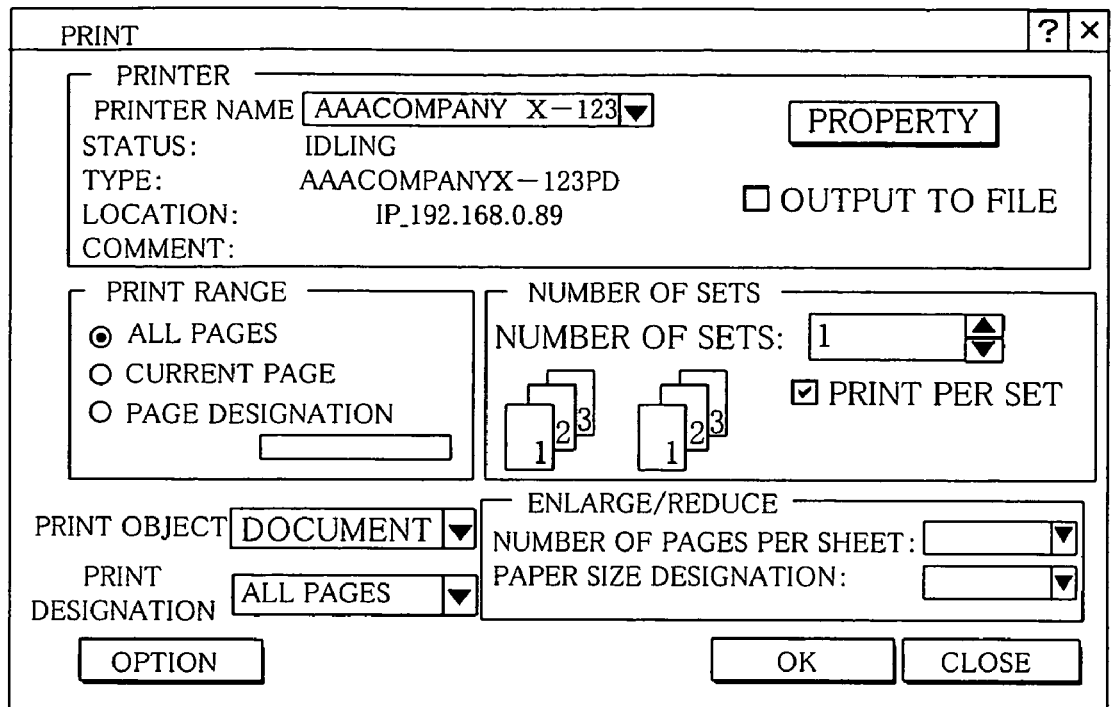
FIGS. 16A-16C show an example of a print window.
Figure 16B:
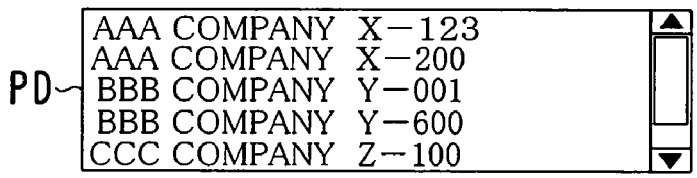
Figure 16C:
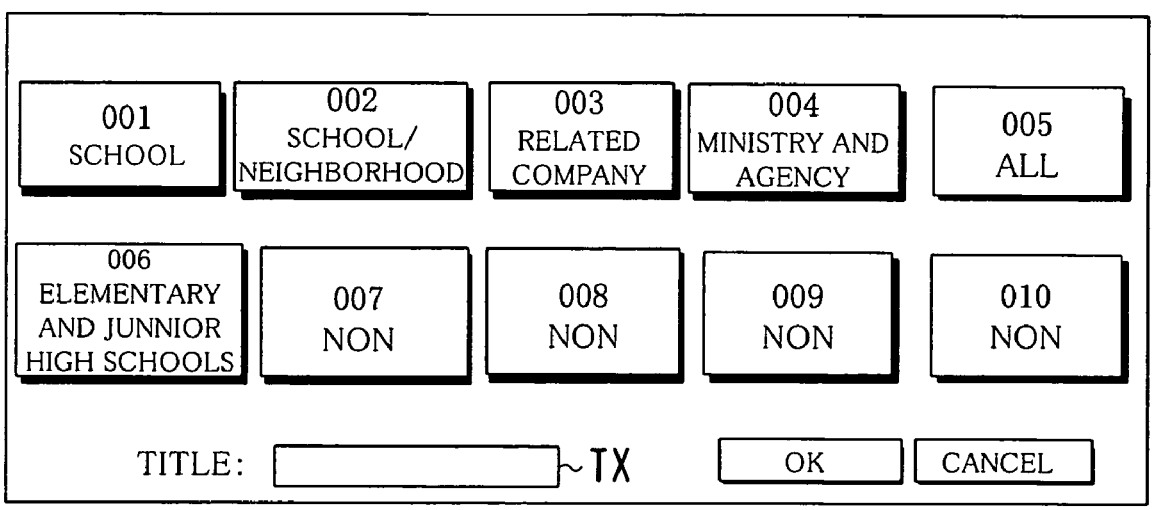
Figure 17:
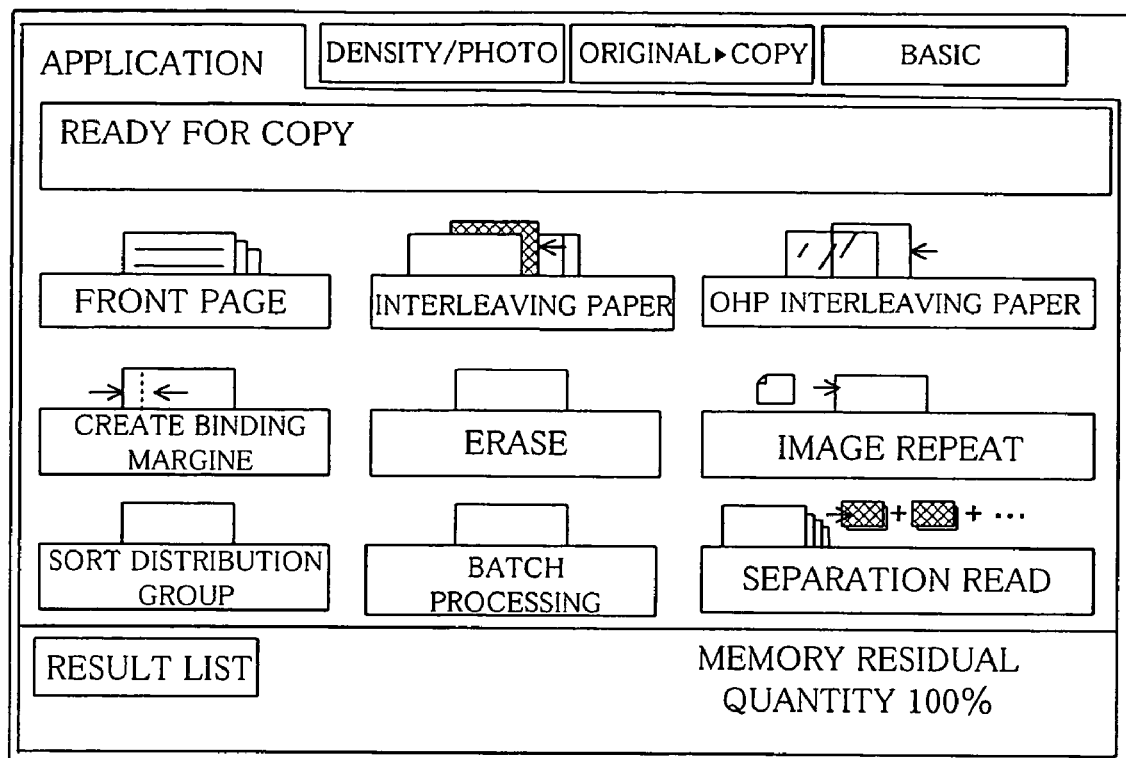
FIG. 17 shows an example of an initial menu window.

FIGS. 16A-16C show an example of a print window HG26 and FIG. 17 shows an example of an initial menu window HG15.

The distribution command acceptance portion 101 shown in FIG. 4 performs processing of accepting a command indicating that distribution material should be distributed from a material transmission terminal 2 to endpoint users. The print data sorting portion 102 performs processing of sorting data of distribution material in boxes 50 of the specified endpoint users. These processing steps are mentioned below.

A person in charge in a division of a government office, i.e., a source user operates a material transmission terminal 2 installed at the division to prepare electronic data 73 of distribution material. When the material transmission terminal 2 is, for example, an MFP, a paper document of the distribution material is scanned to be converted into image data, so that electronic data 73 are prepared. When the material transmission terminal 2 is a PC, word-processing software, spreadsheet, or Desktop Publishing (DTP) software is used to create distribution material and to prepare electronic data 73. Alternatively, even when the material transmission terminal 2 is a PC, it is possible that a scanner connected to the material transmission terminal 2 is used to scan a paper document and to prepare electronic data 73, similar to the case where the material transmission terminal 2 is an MFP.

The electronic data 73 of the distribution material thus prepared are transmitted from the material transmission terminal 2 to the material delivery server 1 through the following procedure. When the material transmission terminal 2 is a PC, the source user performs a predetermined operation to display a print window HG26, which is shown in FIG. 16A, for issuing a command indicating that the distribution material should be printed.

The source user clicks a pull-down menu PD to display a list of output destinations as shown in FIG. 16B. Then, the source user selects an "MFP FILE SORTER" representing the print conditions and others memorizing portion 105 in the material delivery server 1. Referring back to the print window HG26, the source user clicks a "property" button to display a list of distribution groups as shown in FIG. 16C, then to select a distribution group to which the distribution material is intended to be distributed. The source user types a title of the distribution material in a text box TX. After that, the source user goes back to the print window HG26 and clicks an "OK" button.

The material transmission terminal 2 converts the electronic data 73 of the distribution material into data corresponding to a page-description language (a PostScript, a PCL or others, for example) of the material delivery server 1 to generate print data 70. Then, the material transmission terminal 2 transmits this print data 70 to the material delivery server 1 along with the information selected in FIGS. 16A-16C (hereinafter, referred to as "print setting information 83").

When the material transmission terminal 2 is an MFP, the source user clicks an "application" tag to select a "distribution group sorting" button on the initial menu window HG15, a window similar to the window shown in FIG. 16C is displayed. Here, the source user selects a distribution group to which the distribution material is intended to be distributed.

When a paper document of the distribution material has not been scanned yet, the source user puts the paper document on the automatic document feeder of the MFP to press a start button. Responding to this, the MFP reads an image described in the paper document to generate electronic data 73. When the paper document of the distribution material has already been scanned, the source user performs a predetermined operation to select distribution material to be distributed, then to press the start button.

The MFP converts the electronic data 73 of the distribution material into data corresponding to the page-description language of the material delivery server 1, so that print data 70 are generated. Then, the MFP transmits the print data 70 to the material delivery server 1 along with the print setting information 83 indicative of a distribution group of endpoints, or others.

The prepared data of distribution material may be transmitted to the material delivery server 1 as the print data 70 in the form of a PDF, a TIFF or others (i.e., in the form of the electronic data 73 without any change), instead of converting the prepared data into data corresponding to the page-description language of the material delivery server 1.

Referring back to FIG. 4, the distribution command acceptance portion 101 in the material delivery server 1 receives the print data 70 and the print setting information 83 from the material transmission terminal 2 together with a command indicating that the distribution material should be distributed. The print data sorting portion 102 associates the received print data 70 with the received print setting information 83 to store the print data 70 and the print setting information 83 in a box 50 of each endpoint user belonging to a distribution group specified in the print setting information 83. When a distribution group of "group ID=001" (see FIGS. 12A-12C) is specified, for example, the print data 70 and the print setting information 83 are stored in each of the boxes 50 of six endpoint users.

Note that the material delivery server 1 can be operated to store the print data 70 of the distribution material in boxes 50. In such a case, a paper document of the distribution material is put on the automatic document feeder of the material delivery server 1 and processing and operations are performed in a similar way to the steps mentioned above.

[Delivery of Sorted Distribution Material]

The transmission data generation portion 106, the print data transmission portion 107 and the transmission timing monitoring portion 108 perform processing for sending data of distribution material (print data 70) that are accumulated in boxes 50 to each material reception terminal 3 of endpoint users. This processing is performed through the following procedure.

The timing when the print data 70 are transmitted to endpoint users depends on a set value of the item of "processing start time" or "processing end time" indicated in the print conditions information 80 (see FIGS. 8A-8D) of the endpoint users. The transmission timing monitoring portion 108 monitors transmission timing based on these set values through the following steps.

More particularly, the transmission timing monitoring portion 108 checks the current date and time appropriately. When detecting that it is processing start time of any of endpoint users, the transmission timing monitoring portion 108 informs the transmission data generation portion 106 of the corresponding endpoint users to issue a transmission start command. When it is 17:00, for example, the transmission timing monitoring portion 108 informs the transmission data generation portion 106 of names or IDs of "B elementary school", "H town", "J company" and "F company" to issue a transmission start command. However, when "user command" is set as the item of "processing start time", such as a case of "A elementary school", the transmission timing monitoring portion 108 issues a transmission start command only when receiving instructions of the corresponding endpoint user.

Concerning an endpoint user having a set value in the item of "processing end time", it is necessary to complete output of distribution material in a material reception terminal 3 of the endpoint user by the date and time indicated as the set value. On that account, the transmission timing monitoring portion 108 estimates time required from start of transmission of print data 70 that are accumulated in a box 50 of the endpoint user to end of output by the material reception terminal 3. The required time is subtracted from the processing end time, calculating time when transmission processing should be started. Then, when it is the time when transmission processing should be started, the transmission timing monitoring portion 108 informs the transmission data generation portion 106 of the name or ID of the endpoint user to issue a transmission start command.

Note that the required time can be determined based on the number or data volume of print data 70 accumulated in a box, contents of print conditions information 80 of the corresponding endpoint user, processing speed of a material reception terminal 3, communication speed between the material delivery server 1 and the material reception terminal 3 or others. The time when transmission processing should be started is calculated at fixed intervals, e.g., every couple of minutes or every time when new print data 70 are stored in a box 50.

When being informed of an endpoint user from the transmission timing monitoring portion 108, the transmission data generation portion 106 performs a setting of print conditions for all untransmitted (undistributed) print data 70 that are accumulated in a box 50 of the endpoint user, so that print data 71 for transmission are generated. On this occasion, if necessary, a format of the print data 70 is converted based on the print conditions information 80 shown in FIGS. 8A-8D.

For example, when a page-description language describing the print data 70 is identical to a page-description language used in a material reception terminal 3 of the endpoint user, the print data 70 are so rewritten that output (printing) is carried out in accordance with setting indicated in the items of "print conditions" and "finish" in the print conditions information 80. Thereby, print data 71 are generated. Note that the page-description language used in the material reception terminal 3 is determined by a type indicated in the item of "device" in the print conditions information 80.

When the page-description language describing the print data 70 does not correspond to the page-description language used in the material reception terminal 3 of the endpoint user, the print data 70 are converted into the page-description language of the material reception terminal 3, thus generating print data 71. On this occasion, similarly to the example mentioned above, the print data 71 are so generated that output (printing) is carried out in accordance with a setting indicated in the items of "print conditions" and "finish".

When the print data 70 are a file in the form of a PDF, a TIFF or the like, the print data 70 are converted into the page-description language of the material reception terminal 3 based on the print conditions information 80, so that print data 71 are generated.

In the case where a set value is presented in the item of "file format" such as a case of "E high school" or "F high school", the print data 70 are converted into a file format of the set value, which generates print data 71.

The print data transmission portion 107 transmits the print data 71 thus generated to addresses of material reception terminals 3 of endpoint users at the same time. When "e-mail" is set in the item of "device", such as "E high school", all generated print data 71 are attached to an e-mail message for transmission.

After completion of transmission, the print data 70 that are source data of the print data 71 are deleted from a box 50. Alternatively, a flag of "transmitted" may be set to the print data 70.

With respect to an endpoint user whose print conditions information 80 says a circle in the item of "front page printing", front page print data 72 for printing a front page are generated to be transmitted along with print data 71. On the front page is described a list indicating a title of distribution material that is distributed to the endpoint user at this time, the number of pages thereof, a name of transmission source (source user) thereof, time when the source user issued a transmission command, names of other endpoint users or others.

A material reception terminal 3 of an endpoint user performs processing of outputting (printing, displaying on a display, writing into a recording medium or the like) distribution material based on the received print data 71. As described before, the print data 71 incorporate the print conditions information 80 (see FIGS. 8A-8D) of the endpoint user. Accordingly, distribution material can be obtained that supports specification of the material reception terminal 3 of the endpoint user and suits a preference of the endpoint user.

When "sorting" is set in print data 71, the output order of distribution material is determined in accordance with the setting. In the case of "read order", the distribution material is outputted in the order that print data 70, which are source data of the print data 71, are stored in a box 50. In the case of "document order", the distribution material is outputted in the order of predetermined items (title, source, document number or the like). Further, when finish (finishing) such as "punch" or "staple" is set, these processes are followed by output of distribution material. When front page print data 72 are received, a front page is also outputted.

Figure 18:
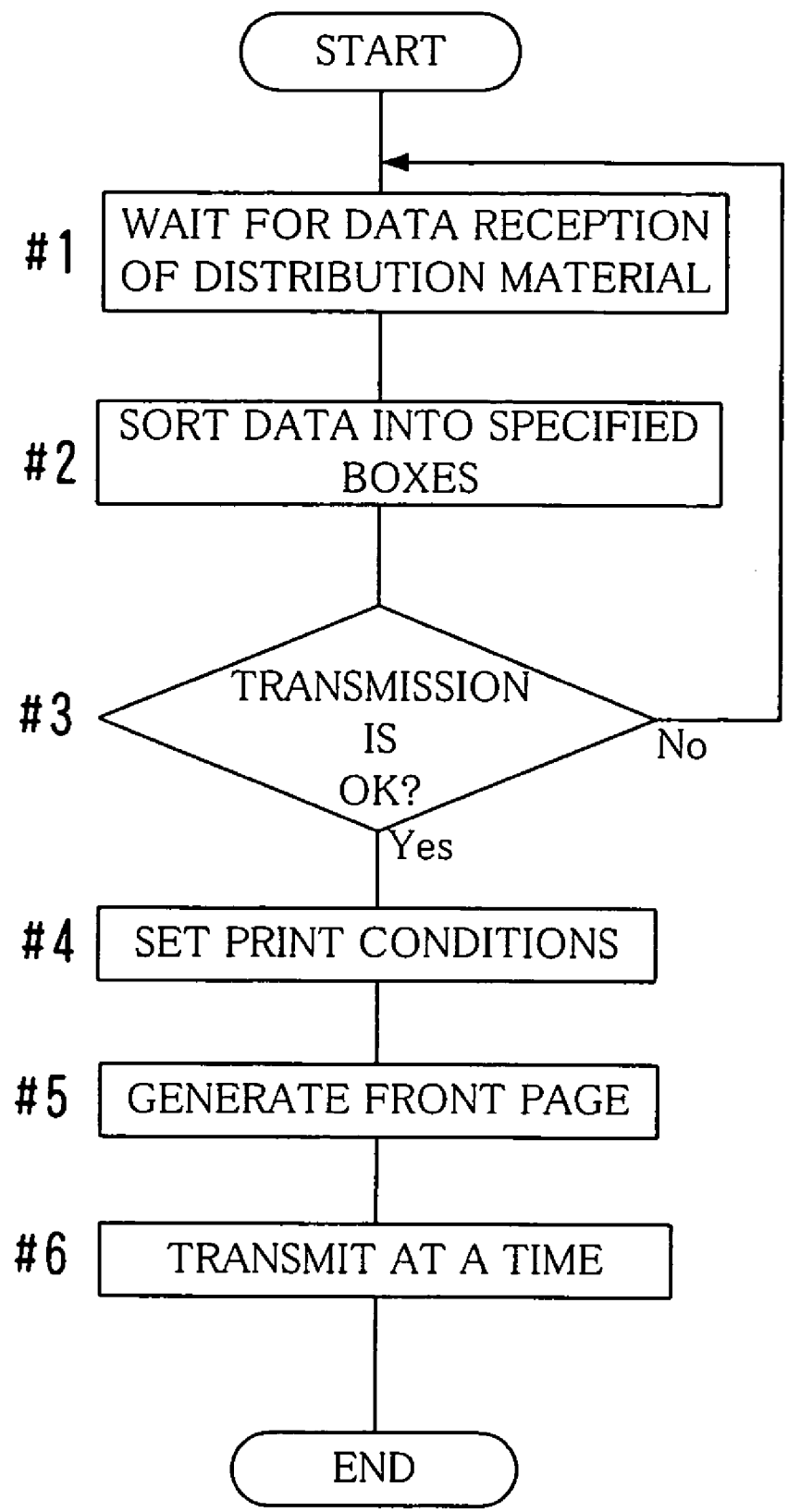
FIG. 18 is a flowchart explaining an example of processing in the material delivery server.

FIG. 18 is a flowchart explaining an example of processing of the material delivery server 1. Next, an explanation is given to the processing order of the material delivery server 1 when relaying data of distribution material that are delivered from a material transmission terminal 2 to a material reception terminal 3, with reference to the flowchart.

Referring to FIG. 18, when receiving data of distribution material (print data 70) from the material transmission terminal 2 (#1), the material delivery server 1 stores the print data 70 in a box 50 of an endpoint user belonging to the designated distribution group (#2). In the case of plural endpoint users, the print data 70 are copied to be stored in the respective boxes 50.

The material delivery server 1 monitors timing for transmitting the distribution material based on the items of "processing start time", "processing end time" and the like indicated in the print conditions information 80 (see FIGS. 8A-8D) of each of the endpoint users (#3). During the monitoring, the material delivery server 1 performs sorting processing every time when print data 70 are transmitted (#1 and 2).

In the case where it is time when distribution material should be transmitted to a certain endpoint user, or in the case where the material delivery server 1 receives a command from a certain endpoint user (#Yes in #3), the material delivery server 1 converts untransmitted print data 70 that are accumulated in a box 5 of the corresponding endpoint user into data meeting the print conditions information 80 of the endpoint user, so that print data 71 are generated. Stated differently, the material delivery server 1 sets print conditions (#4). On this occasion, if necessary, the material delivery server 1 converts the print data 70 into a page-description language of the material reception terminal 3 of the endpoint user.

The material delivery server 1 generates front page print data 72 for outputting a front page as needed (#5). Then, the material delivery server 1 transmits the print data 71 and the front page print data 72 that are generated in steps #4 and 5 to the material reception terminal 3 of the endpoint user as batch processing, e.g., at a time (#6). After the transmission, the process goes back to steps #1-3 so that the material delivery server 1 repeats the sorting processing of print data 70, the monitoring processing of transmission timing or others.

According to the present embodiment, a source user can easily distribute material with print conditions suitable for each endpoint user, compared to conventional methods. In addition, since a work of setting print conditions of material and a work of separating printed material are not required, typographical errors and separation errors can be reduced. The division of the scanning step and the print step increases the number of scan pages of material per unit time.

An endpoint user adjusts time when distribution material is obtained and thereby, night printing and unattended printing can be performed. Accordingly, the endpoint user can use a material reception terminal 3 of the endpoint user effectively.

Figure 19:
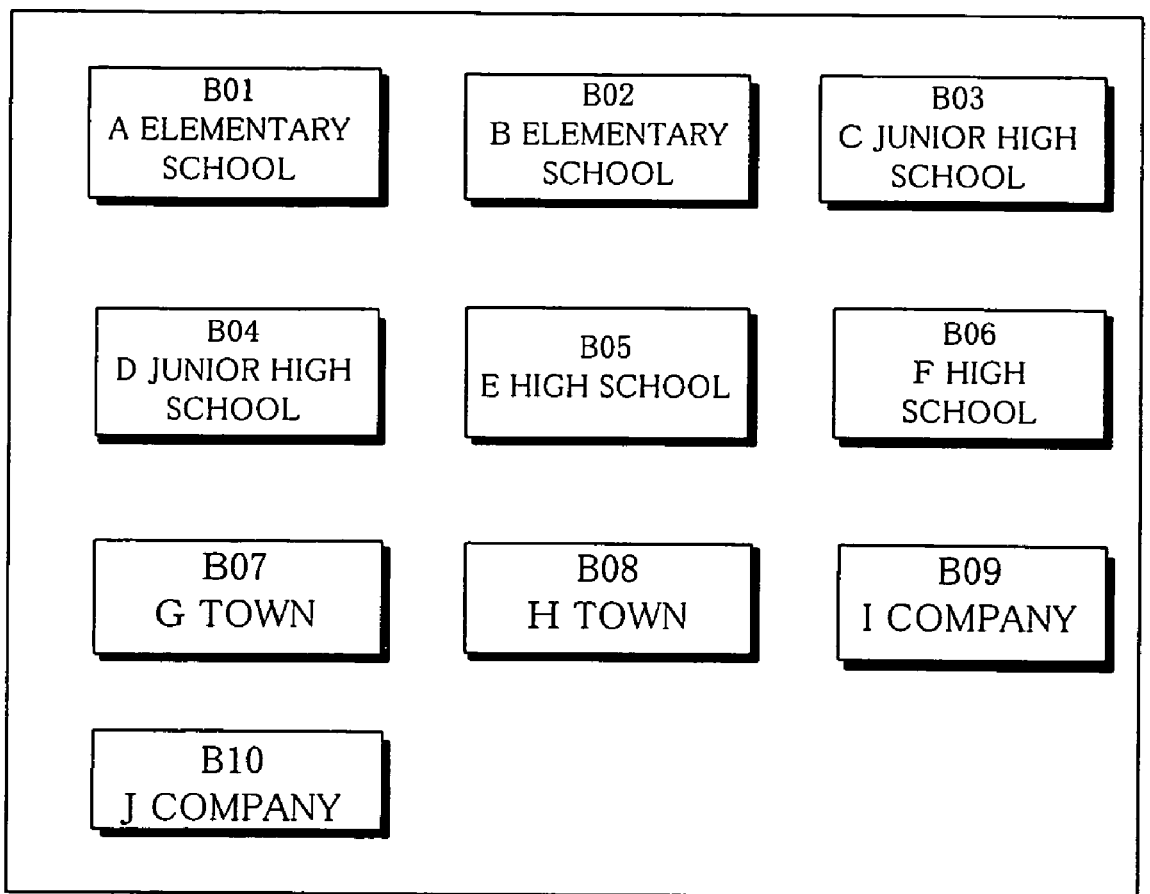
FIG. 19 shows an example of an endpoint selection window.
Figure 20:
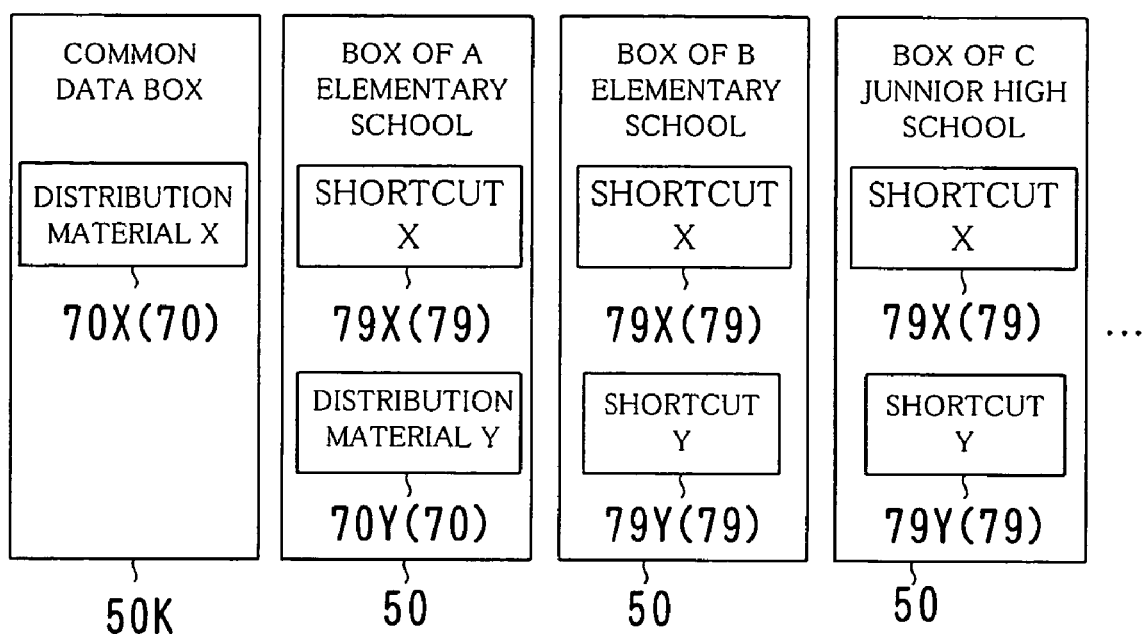
FIG. 20 is a diagram explaining a modification of an installation method of boxes.

FIG. 19 shows an example of an endpoint selection window HG16, FIG. 20 is a diagram explaining a modification of an installation method of boxes 50 and FIG. 21 shows an example of a distribution material selection window HG27.

In the present embodiment, an explanation is made to a case where data of distribution material are distributed from a government office to each association (endpoint user). Instead, data, e.g., image data such as an application form can be transmitted from each association to each division of a government office. In this case, the material delivery server 1 is provided with a box 50 for each division. A staff of an association specifies destination divisions to send data from a material reception terminal 3 of the staff to the material delivery server 1. Then, the data are accumulated in a box 50 of each of the specified divisions to be transmitted to material transmission terminals 2 at the same time at predetermined timing. More specifically, in this case, each of the material transmission terminals 2 is used as a material reception terminal, while the material reception terminal 3 is used as a material transmission terminal. In addition, data exchange is possible between associations or between divisions in a government office.

The material delivery server 1 installed in a government office or an MFP other than the material delivery server 1 (an MFP installed in a copy room or a sort room, for example) may be used to print distribution material for mailing for an endpoint user who has difficulty in installing a material reception terminal 3. In this case, processing may be performed through the following procedure.

A person in charge in a government office clicks an "application" tag and a "batch processing" button in sequence on the initial menu window HG15 shown in FIG. 17, to display the endpoint selection window HG16 shown in FIG. 19. Here, the person selects an endpoint user to whom distribution material is intended to be sent by post and presses a start button of the operation display device 1*j* (see FIG. 3).

Then, the material delivery server 1 prints all untransmitted distribution material (print data 70) stored in a box 50 of the selected endpoint user at the same time in accordance with contents of the print conditions information 80 of the endpoint user. The person arranges the printed material to send the same to the endpoint user by post. Such a structure eliminates the need for performing a work of sorting distribution material as in the conventional ways, ensuring that a burden imposed on a person in charge can be reduced.

In the present embodiment, in the case of delivery of distribution material to plural endpoint users, print data 70 of the distribution material are copied to be stored in boxes 50 of the respective endpoint users. Instead, it is possible that the print data 70 are stored only in an arbitrary box 50 and path information (link information) indicative of a shortcut, i.e., a storage location of the print data 70 is stored in the other boxes 50.

As shown in FIG. 20, for example, a box 50K for storing data to be shared is prepared. In the case of distribution of distribution material X to A elementary school, B elementary school and C junior high school, print data 70X are stored in the box 50K. In boxes 50 of the elementary and junior high schools is stored a shortcut 79X instead of the print data 70X, the shortcut 79X indicating a storage location of the print data 70X.

Further, in the case of distribution of distribution material Y to A elementary school, B elementary school and C junior high school, print data 70Y are stored only in a box 50 of any one of the endpoint users (A elementary school, for example). In boxes 50 of the remaining endpoint users (B elementary school and C junior high school) is stored a shortcut 79Y instead of the print data 70Y, the shortcut 79Y indicating a storage location of the print data 70Y.

When a shortcut 79 is stored in boxes 50, the transmission data generation portion 106 shown in FIG. 4 calls up print data 70 corresponding to the shortcut 79 to generate print data 71. This structure can reduce data volume memorized in the magnetic storage device 1*f* of the material delivery server 1.

In the present embodiment, distribution material accumulated in a box 50 is transmitted to an endpoint user at the same time at predetermined timing. Instead, a constitution is possible in which only a part of distribution material can be transmitted at the request of an endpoint user. In this case, processing may be performed, for example, through the following procedure.

When a material reception terminal 3 is a PC, an endpoint user types a predetermined URL in a Web browser of the material reception terminal 3 of the endpoint user to display the distribution material selection window HG27 as shown in FIG. 21. On this window is indicated a list LT of distribution material that is currently accumulated in a box 50 of the endpoint user. The endpoint user clicks a "Send" button provided on the right hand side of the window, the "Send" button corresponding to desired distribution material.

In response to this, the material delivery server 1 converts print data 70 of the corresponding distribution material into print data 71 and sends the print data 71 to the material reception terminal 3. Note that when a "document processing conditions application" checkbox is checked, the material delivery server 1 converts the print data 70 into the print data 71 based on print conditions (the print setting information 83) that a source user has set with respect to the print data 70 using the print window HG26 shown in FIG. 16. When the checkbox is not checked, the material delivery server 1 performs data conversion based on the print conditions information 80 (see FIGS. 8A-8D) of the endpoint user. When the material reception terminal 3 is an MFP, desired distribution material may be selected, similarly to the case where the material reception terminal 3 is a PC. Then, the material reception terminal 3 may make a request to the material delivery server 1 for the selected distribution material at timing when the start button (see FIG. 3) is pressed.

In the present embodiment, endpoint users are associations such as schools, companies, neighborhood associations and ministries and agencies. Instead, endpoint users may be individual users. Further, according to the present embodiment, endpoints of distribution material are selected by choosing a distribution group (see FIG. 16C). Instead, a constitution is possible in which endpoint users can be individually selected.

It is possible to perform user authentication before using the material delivery server 1, the material transmission terminal 2 or the material reception terminal 3. It is also possible that a user can perform operations discussed above only when the user is identified as an authorized user.

The distribution group information 82 (see FIGS. 12A-12C) showing structures of distribution groups is managed by the material delivery server 1 in the present embodiment. Instead, it is possible to set independent distribution group information 82 for each material transmission terminal 2.

According to the present embodiment, print data 70 are temporarily stored in a box 50 and, after issuing a transmission start command by the transmission timing monitoring portion 108, processing is performed for converting the print data 70 into print data 71 suitable for a material reception terminal 3 as a transmission destination. Instead, conversion of the print data 70 into the print data 71 may be followed by storage in a box 50.

Structures, processing contents and processing order of each part or whole part of the material delivery system 100, the material delivery server 1, the material transmission terminal 2 and the material reception terminal 3 can be varied as required within the scope of the present invention.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An image data delivery apparatus comprising:
 a user memory area including a plurality of boxes, wherein one of the boxes is prepared for each user;
 a data memory control portion that makes a respective box in the user memory area for a user to whom image data is delivered memorize the delivered image data;
 a print conditions memorizing portion that memorizes print conditions for each user;
 a print data generation portion that generates print data for printing a printed material based on the print conditions memorized in the print conditions memorizing portion for a user corresponding to the user memory area, the print data being generated from the image data memorized in the user memory area; and
 a transmission portion that transmits the print data that are generated by the print data generation portion to a terminal of the user corresponding to the user memory area where the image data based on which the print data has been generated are memorized.

2. The image data delivery apparatus according to claim 1, wherein
 the print data generation portion generates print data of all untransmitted image data as batch processing, the all untransmitted image data being memorized in the user memory area for one user; and
 the transmission portion transmits the print data as batch processing.

3. The image data delivery apparatus according to claim 1, wherein
 the image data are associated with delivery source print conditions that are print conditions set by a delivery source of the image data; and
 when any of the image data memorized in the user memory area is specified, the print data generation portion generates print data based on the delivery source print conditions corresponding to the image data instead of setting the print conditions.

4. The image data delivery apparatus according to claim 1, wherein
 when plural users are specified as delivery destinations of the image data, the data memory control portion makes any one of the user memory areas for the users memorize the image data and makes the other user memory areas memorize link information instead of the image data, the link information indicating a memory location of the image data and a data name thereof; and
 the print data generation portion generates print data using the image data indicated in the link information when the link information is memorized in the user memory area.

5. The image data delivery apparatus according to claim 1, further comprising a second memory area that is a memory area different from the user memory area,
 wherein
 the data memory control portion makes the second memory area memorize the image data and makes the user memory area memorize link information instead of the image data, the link information indicating a memory location of the image data and a data name thereof; and
 the print data generation portion generates print data using the image data indicated in the link information when the link information is memorized in the user memory area.

6. A method for delivering image data using an apparatus including a storage medium, a communication portion, a memory control portion and a print data generation portion, the method comprising:
 preparing a box in a user memory area for each user in the storage medium in advance;
 making the storage medium memorize print conditions for each user in advance;
 a first step of making a respective one of the boxes in the user memory area for a user to whom image data is delivered memorize the image data to be delivered, the first step being performed by the memory control portion;
 a second step of generating print data for printing a printed material based on the print conditions memorized in the storage medium for a user corresponding to the user memory area, the print data being generated from the image data memorized in the user memory area, the second step being performed by the print data generation portion; and
 a third step of transmitting the print data that are generated by the print data generation portion to a terminal of the user corresponding to the user memory area where the image data based on which the print data has been generated are memorized, the third step being performed by the communication portion.

7. The method according to claim 6, wherein
in the second step, print data of all untransmitted image data are generated as batch processing, the all untransmitted image data being memorized in the user memory area for one user; and
in the third step, the print data are transmitted as batch processing.

8. The method according to claim 6, wherein
the image data are associated with delivery source print conditions that are print conditions set by a delivery source of the image data; and
in the second step, when any of the image data memorized in the user memory area is specified, print data are generated by setting the delivery source print conditions corresponding to data instead of setting the print conditions for the material data.

9. The method according to claim 6, wherein
in the first step, when plural users are specified as delivery destinations of the image data, any one of the user memory areas for the users is made to memorize the image data and the other user memory areas are made to memorize link information instead of the image data, the link information indicating a memory location of the image data and a data name thereof; and
in the second step, print data are generated using the image data indicated in the link information when the link information is memorized in the user memory area.

10. The method according to claim 6,
wherein when the apparatus further includes a second memory area that is a memory area different from the user memory area, in the first step, the second memory area is made to memorize the image data and the user memory area is made to memorize link information instead of the image data, the link information indicating a memory location of the image data and a data name thereof; and
in the second step, print data are generated using the material data indicated in the link information when the link information is memorized in the user memory area.

11. A recording medium storing a computer program used for a computer that includes a box in a user memory area prepared for each user and memorizes print conditions for each user, the program making the computer perform the processing of:
making a respective one of the boxes in the user memory area for a user to whom image data is delivered memorize the image data to be delivered;
generating print data for printing a printed material based on the print conditions memorized for a user corresponding to the user memory area, the print data being generated from the image data memorized in the user memory area; and
transmitting the print data that are generated based on the image data memorized in the user memory area to a terminal of the user corresponding to the user memory area where the image data based on which the print data has been generated are memorized.

12. An image data delivery apparatus comprising:
a user memory area including a plurality of boxes, wherein one of the boxes is prepared for each user;
a data memory control portion that makes a respective box in the user memory area for a user to whom image data is delivered memorize the delivered image data;
an output conditions memorizing portion that memorizes output conditions for each user;
a conversion portion that converts the image data memorized in the user memory area into output data based on the output conditions memorized in the output conditions memorizing portion for a user corresponding to the user memory area; and
a transmission portion that transmits the output data obtained by converting the image data using the conversion portion to a terminal of the user corresponding to the user memory area where the image data based on which the output data has been obtained are memorized.

13. An image data delivery apparatus comprising:
a user memory area including a plurality of boxes, wherein one of the boxes is prepared for each user;
a print conditions memorizing portion that memorizes print conditions for each user;
a print data generation portion that generates print data for each user to whom image data to be delivered is delivered by setting the print conditions corresponding to the user of the image data;
a data memory control portion that makes a respective box in the user memory area for the user memorize the print data of the user, the print data being generated by the print data generation portion; and
a transmission portion that transmits the print data memorized in the user memory area to a terminal of the user relating to the respective box of the user memory area.

* * * * *